US010306219B2

(12) United States Patent
Batmunkh et al.

(10) Patent No.: US 10,306,219 B2
(45) Date of Patent: May 28, 2019

(54) DISPLAY APPARATUS AND CONTROL METHOD THEREOF FOR DETECTING VIDEO CONTENT SWITCH

(71) Applicant: SAMSUNG ELECTRONICS CO., LTD., Suwon-si, Gyeonggi-do (KR)

(72) Inventors: Dulguun Batmunkh, Suwon-si (KR); Jong-ho Lea, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 63 days.

(21) Appl. No.: 15/342,563

(22) Filed: Nov. 3, 2016

(65) Prior Publication Data

US 2017/0127056 A1 May 4, 2017

(30) Foreign Application Priority Data

Nov. 4, 2015 (KR) ........................ 10-2015-0154724

(51) Int. Cl.
*H04N 21/44* (2011.01)
*H04N 17/02* (2006.01)
*H04N 5/445* (2011.01)
*H04N 17/04* (2006.01)
*H04N 9/75* (2006.01)
(Continued)

(52) U.S. Cl.
CPC ......... *H04N 17/02* (2013.01); *H04N 5/44543* (2013.01); *H04N 9/75* (2013.01); *H04N 17/04* (2013.01); *H04N 21/4316* (2013.01); *H04N 21/4383* (2013.01); *H04N 21/44008* (2013.01); *G06T 2207/10016* (2013.01); *G06T 2207/20021* (2013.01); *G09G 5/026* (2013.01);
(Continued)

(58) Field of Classification Search
CPC ................................................ H04N 21/44008
See application file for complete search history.

(56) References Cited

U.S. PATENT DOCUMENTS 7,031,517 B1 * 4/2006 Le .......................... G06K 9/342
375/E7.13
2006/0187358 A1 8/2006 Lienhart et al.
(Continued)

FOREIGN PATENT DOCUMENTS

EP 2 720 469 A1 4/2014
EP 2 884 741 A1 6/2015
(Continued)

OTHER PUBLICATIONS

Search Report dated Mar. 29, 2017 in counterpart International Patent Application No. PCT/KR2016/012600.
(Continued)

*Primary Examiner* — Ryan McCulley
(74) *Attorney, Agent, or Firm* — Nixon & Vanderhye P.C.

(57) ABSTRACT

A display apparatus including: a display; a signal receiver configured to receive a video signal including a plurality of frames; and at least one processor configured to select a main area corresponding to a main color of a first frame among a plurality of divisional areas in the first frame of the video signal, determine whether the first frame is a reference frame based on the size of the selected main area as compared with the first frame, and control the display to display an image based on the video signal in accordance with the determined reference frame.

10 Claims, 29 Drawing Sheets

(51) Int. Cl.
*H04N 21/438* (2011.01)
*H04N 21/431* (2011.01)
*G09G 5/02* (2006.01)

(52) U.S. Cl.
CPC ..... *G09G 2340/16* (2013.01); *G09G 2354/00* (2013.01); *G09G 2360/16* (2013.01)

(56) References Cited

U.S. PATENT DOCUMENTS

| | | | | |
|---|---|---|---|---|
| 2007/0192782 | A1* | 8/2007 | Ramaswamy | H04H 60/37 725/9 |
| 2012/0063678 | A1* | 3/2012 | Asikainen | G06T 9/00 382/165 |
| 2012/0287234 | A1* | 11/2012 | Kim | H04N 21/472 348/43 |
| 2013/0121575 | A1 | 5/2013 | Kim et al. | |
| 2014/0067828 | A1* | 3/2014 | Archibong | H04L 65/4084 707/748 |
| 2014/0101683 | A1* | 4/2014 | Arshavski | H04N 5/147 725/14 |
| 2014/0230002 | A1* | 8/2014 | Kitazato | H04N 21/4383 725/109 |
| 2015/0325019 | A1 | 11/2015 | Sukeno et al. | |
| 2016/0073047 | A1* | 3/2016 | Yabu | H04N 5/45 348/565 |
| 2016/0147882 | A1* | 5/2016 | Li | G06F 3/017 707/769 |

FOREIGN PATENT DOCUMENTS

| | | |
|---|---|---|
| JP | 2009-069613 | 4/2009 |
| JP | 2009-105505 | 5/2009 |
| KR | 10-2006-0063937 | 6/2006 |
| KR | 10-2007-0112130 | 11/2007 |
| KR | 10-2011-0089935 | 8/2011 |
| KR | 10-2011-0093616 | 8/2011 |
| WO | 2014/024553 | 2/2014 |

OTHER PUBLICATIONS

European Search Report dated Jan. 19, 2018 for EP Application No. 16862448.4.

* cited by examiner

```
histY[0..255] = {0};

for (y = top; y <= bottom; y++) {
  for (x = left; x <= right; x++) {
    histY[Y.getYpixVal(x, y)]++;
  }
}
```

FIG. 12

```
320 kMinColorLimit = 0;
kMaxColorLimit = 255;
maxHistY = 0;

for (i = kMinColorLimit; i <= MaxColorLimit; i++) {
  if (histY[i] > maxHistY) {
    maxHistY = histY[i];
    maxColorY = i;
  }
}
```

```
kDensitySize = 5;
kDensityPercent = 90.0;
endPointX = width / kDensitySize;
endPointY = height / kDensitySize;

for (i = 0; i <= endPointY; i++) {
   for (j = 0; j <= endPointX; j++) {
       smoothArr[i][j] =
calculateDensity();
   }
}
```

```
390 for (i = 0; i <= endPointY; i++) {
   for (j = 1; j <= endPointX; j++) {
     if (smoothArr[i][j] == 0) dp[i][j] = 0;
     else {
        dp[i][j] = dp[i][j - 1] + 1;
     }
   }
}
```

FIG. 18

```
400 for (i = 1; i <= endPointY; i++) {
    for (j = 1; j <= endPointX; j++) {
        h = 1;
        localMax = dp[i][j];
        while (i >= h) {
            if ((w * (h + 1)) < localMax) {
                localMax = w * (h + 1);
                h++;
            }
            else break;
        }
        if (localMax > globalMax) {
            globalMax = localMax;
        }
    }
}
```

if (realArea * p <= globalMax * 100) {
   isNull = true;
}
else isNull = false;
```

… # DISPLAY APPARATUS AND CONTROL METHOD THEREOF FOR DETECTING VIDEO CONTENT SWITCH

CROSS-REFERENCE TO RELATED THE APPLICATION

This application claims priority from Korean Patent Application No. 10-2015-0154724 filed on Nov. 4, 2015 in the Korean Intellectual Property Office, the disclosure of which is incorporated herein by reference.

BACKGROUND

Field

Apparatuses and methods consistent with the exemplary embodiments relate to a display apparatus capable of displaying an image on its own display panel and a control method thereof, and more particularly to a display apparatus having a structure for sensing a null frame, which is inserted when content or a channel is switched, within video frames displayed as time passes in a video signal, and providing various additional services in accordance with sensing results, and a control method thereof.

Description of the Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus processes an image signal or image data received from the exterior in accordance with various image processing processes. The image processing apparatus may display an image based on the processed image data on its own display panel, or output the processed image data to another display apparatus provided with a panel so that on the corresponding display apparatus can display an image based on the processed image signal. In particular, the image processing apparatus that has a display panel is called a display apparatus, and may for example includes a television (TV), a monitor, a portable multimedia player (PMP), a tablet computer, a mobile phone, etc. Further, the display apparatus may be big like the TV to be stationarily installed at a certain position, or small like the tablet PC or the mobile phone to be easily carried by a user.

When content or a channel of an image displayed on the display apparatus is switched, a video frame indicating the switch of the content is generally inserted and displayed. Such a video frame basically has a single color, so that a user can visually distinguish between a previous content image and a following content image with respect to this video frame. Such a video frame is generally called a null frame since it does not include any special content information. When the null frame is displayed, it is time to start displaying an image of switched content. Therefore, the display apparatus can perform various designated operations with respect to time specified by sensing the null frame.

If the display apparatus switches content in response to a user's input for switching the content, the display apparatus autonomously displays the null frame and therefore does not have to sense when the null frame is displayed. However, the display apparatus may not switch content, but an image source of providing a video signal to the display apparatus may switch content. In this case, the image source inserts the null frame at a time switching content if the content is switched from certain content to different content, and transmits it to the display apparatus. Therefore, the display apparatus has to sense the null frame in a video signal received from the image source.

SUMMARY

A display apparatus including: a display; a signal receiver configured to receive a video signal including a plurality of frames; and at least one processor configured to select a main area corresponding to a main color of a first frame among a plurality of divisional areas in the first frame of the video signal, determine whether the first frame is a reference frame based on the size of the selected main area as compared with the first frame, and control the display to display an image based on the video signal in accordance with the determined reference frame. Thus, the display apparatus can accurately sense the reference frame even though an OSD is overlaid on the reference frame of the null frame, and prevent a mistake of sensing a content image of a dark screen or the like as the reference frame.

The reference frame may be inserted in the video signal by an image source for providing the video signal and indicates a content switch in the video signal.

The reference frame may include a null frame.

The at least one processor may process a preset user interface (UI) to be displayed on a content image after preset time elapses from time of when it is determined based on the reference frame that the content switch is generated. Thus, the display apparatus accurately determines a content switching time in accordance with results of sensing the reference frame, thereby providing convenience to a user.

The at least one processor may determine that the first frame is the reference frame if the size of the selected main area is larger than a first preset threshold as compared with the first frame, and may determine that the first frame is not the reference frame if the size of the selected main area is not larger than the first preset threshold as compared with the first frame. Thus, the display apparatus can accurately sense the reference frame even though the OSD is overlaid on this reference frame.

The at least one processor may select the areas formed by single color information of the main color among the plurality of divisional areas, and may select the largest rectangle as the main area among rectangles including only the selected areas. Thus, the display apparatus can easily deduce a candidate area for sensing the reference frame.

The at least one processor may determine that a certain area corresponds to the main color if a percentage of pixels having the main color is greater than a second preset threshold in color information of the certain area, and may determine that a certain area does not correspond to the main color if a percentage of pixels having the main color is not greater than the second preset threshold in the color information of the certain area. Thus, the display apparatus can easily determine whether a certain divisional area corresponds to the main color.

The at least one processor may divide the first frame into the plurality of divisional areas which have the same size as one another.

The at least one processor may select a first color, which is the most included in color information of the first frame, as the main color of the first frame.

The at least one processor may select the first color as the main color if a percentage of pixels in the first frame of the first color is greater than a third preset threshold, and may determine that first frame is not the reference frame if the percentage of pixels in the first frame of the first color is not greater than the third preset threshold. Thus, the display apparatus can easily determine whether the main color exists in the first frame, and which color corresponds to the main color.

A method of controlling a display apparatus, the method including: receiving a video signal including a plurality of frames; selecting a main area corresponding to a main color of a first frame among a plurality of divisional areas in the first frame of the video signal; determining whether the first frame is a reference frame based on the size of the selected main area as compared with the first frame; and displaying an image based on the video signal in accordance with the determined reference frame. Thus, the display apparatus can accurately sense the reference frame even though an OSD is overlaid on the reference frame of the null frame, and prevent a mistake of sensing a content image of a dark screen or the like as the reference frame.

The reference frame may be inserted in the video signal by an image source for providing the video signal and indicates a content switch in the video signal.

The reference frame may include a null frame.

The displaying the image may include: displaying a preset user interface (UI) on a content image after preset time elapses from time of when it is determined based on the reference frame that the content switch is generated. Thus, the display apparatus accurately determines a content switching time in accordance with results of sensing the reference frame, thereby providing convenience to a user.

The determining whether the first frame is the reference frame may include: determining that the first frame is the reference frame if the size of the selected main area is larger than a first preset threshold as compared with the first frame; and determining that the first frame is not the reference frame if the size of the selected main area is not larger than the first preset threshold as compared with the first frame. Thus, the display apparatus can accurately sense the reference frame even though the OSD is overlaid on this reference frame.

The selecting the main area may include: selecting the areas formed by single color information of the main color among the plurality of divisional areas; and selecting the largest rectangle as the main area among rectangles including only the selected areas. Thus, the display apparatus can easily deduce a candidate area for sensing the reference frame.

The selecting the areas formed by the single color information of the main color among the plurality of divisional areas may include: determining that a certain area corresponds to the main color if a percentage of pixels having the main color is greater than a second preset threshold in color information of the certain area; and determining that a certain area does not correspond to the main color if a percentage of pixels having the main color is not greater than the second preset threshold in the color information of the certain area. Thus, the display apparatus can easily determine whether a certain divisional area corresponds to the main color.

The selecting the main area may include: dividing the first frame into the plurality of divisional areas which have the same size as one another.

The selecting the main area may include: selecting a first color, which is the most included in color information of the first frame, as the main color of the first frame.

The selecting the first color as the main color of the first frame may include: selecting the first color as the main color if a percentage of pixels in the first frame of the first color is greater than a third preset threshold; and determining that first frame is not the reference frame if the percentage of pixels in the first frame of the first color is not greater than the third preset threshold. Thus, the display apparatus can easily determine whether the main color exists in the first frame, and which color corresponds to the main color.

BRIEF DESCRIPTION OF THE DRAWINGS

The above and/or other aspects will become apparent and more readily appreciated from the following description of exemplary embodiments, taken in conjunction with the accompanying drawings, in which:

FIG. 11 shows a programming code for drawing a color histogram of a video frame in the display apparatus according to the fourth exemplary embodiment;

FIG. 12 shows a programming code for drawing a maximum value from the histogram in the display apparatus according to the fourth exemplary embodiment;

FIG. 15 illustrates a programming code for determining whether each sub frame is a null frame in the display apparatus according to the fourth exemplary embodiment;

FIG. 18 illustrates a programming code for finding the biggest continuous rectangle in the state that each sub frame is weighted based on the programming code of FIG. 17;

FIG. 20 illustrates a programming code for finally determining whether the video frame is the null frame in the display apparatus according to the fourth exemplary embodiment;

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention.

Further, the exemplary embodiments will describe only elements directly related to the idea of the invention, and description of the other elements will be omitted. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Further, the embodiments respectively described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

Figure 1:
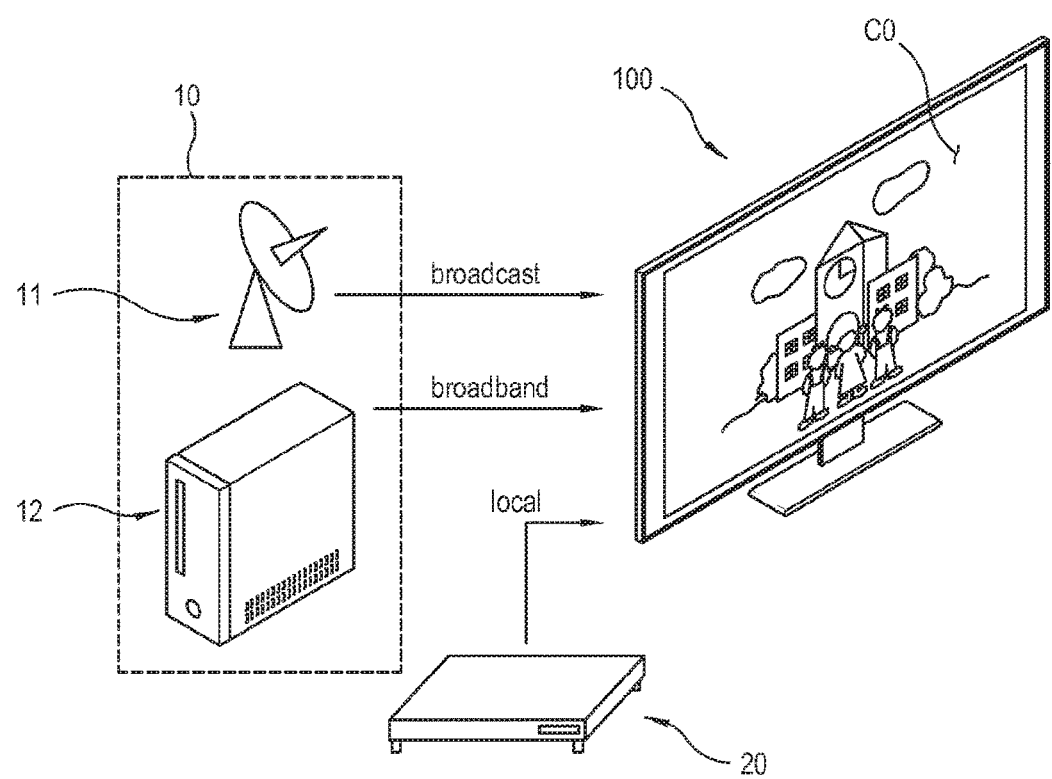
FIG. 1 illustrates a display apparatus according to a first exemplary embodiment.

FIG. 1 illustrates a display apparatus 100 according to a first exemplary embodiment.

As shown in FIG. 1, the display apparatus 100 according to the first exemplary embodiment receives a video signal involving content data from various image sources 10 and 20, and processes an image signal to display an image CO. In this embodiment, the display apparatus 100 is a TV, but the display apparatus 100, to which the present inventive concept is applied, is not limited to the TV. The present inventive concept may be applicable to various types of the display apparatus 100, such as a monitor, a portable multimedia player, a mobile phone, a tablet computer, an electronic frame, an electronic blackboard, an electronic billboard or the like. There are no limits to whether the display apparatus 100 is a stationary type or a mobile type.

The image sources 10 and 20 for providing an image signal to the display apparatus 100 includes an image source 10 for providing an image signal at a relatively long distance from the display apparatus 100, and an image source 20 for providing an image signal at a relatively short distance from the display apparatus 100.

The image source 10 for providing an image signal at the long distance may use one of two transmission networks, i.e. between a broadcast method and a broadband method in order to transmit a video signal to the display apparatus 100. The broadcast method is a classical unidirectional transmission method such as a digital video broadcasting-terrestrial (DVB-T), DVB-satellite (S), DVB-cable (C), etc. As an example of the image source 10 using the broadcast method, there is a transmitter of a broadcasting station. The broadband method uses an interactive internet protocol (IP) access as a frequency band for streaming or downloading audio/video (A/V) content. As an example of the image source 10 using the broadband method, there is a streaming server 12.

The image source 20 for providing an image signal at the short distance may be connected to the display apparatus 100 through a short-range network such as a home network or through a cable by device-to-device. This connection is called local connection. As an example of the image source 20 using the local connection, there is an optical disc player 20 such as a digital versatile disc (DVD) or Blu-ray disc (BD) player.

Below, elements of the display apparatus 100 will be described.

Figure 2:
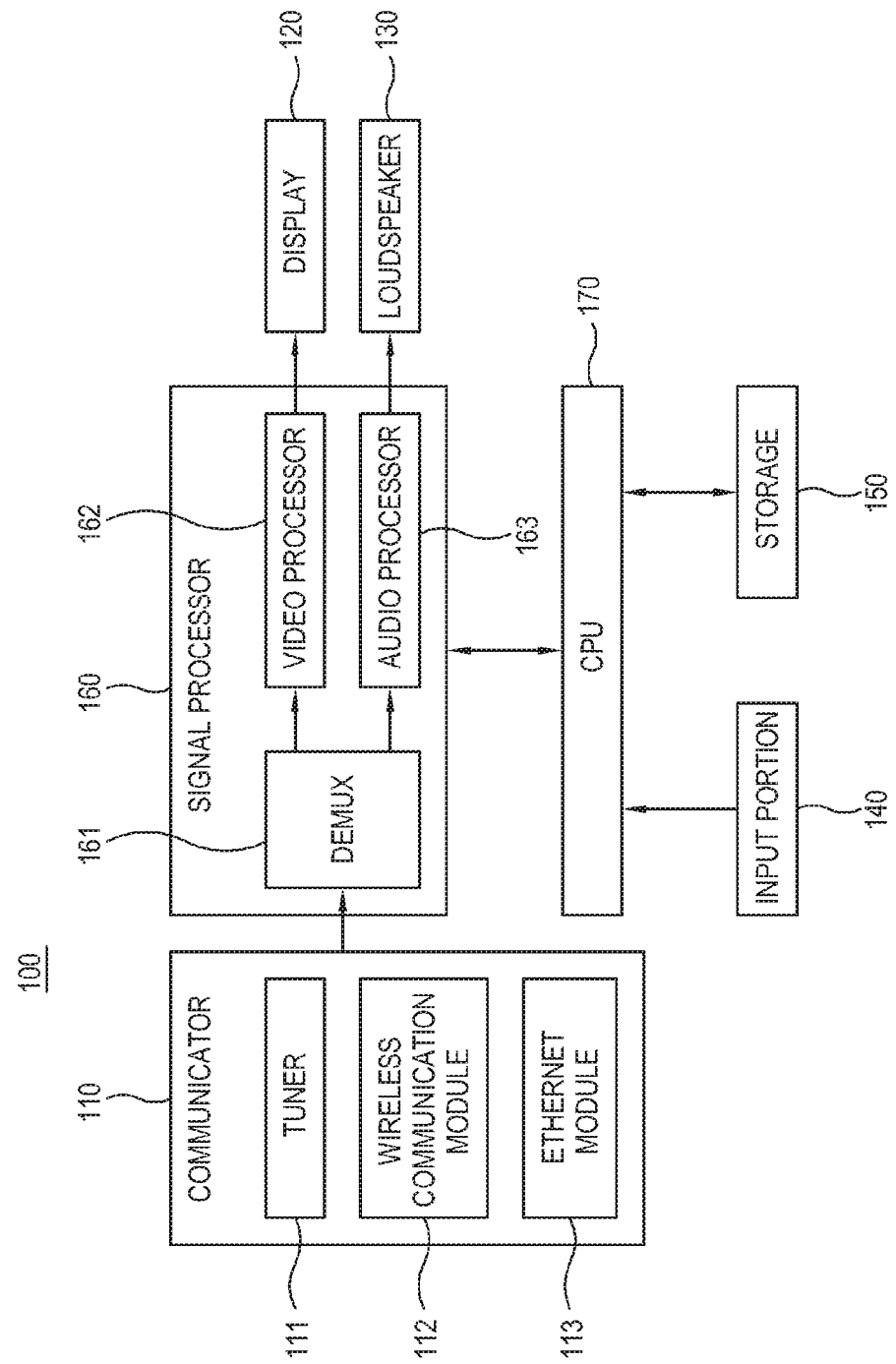
FIG. 2 is a block diagram of the display apparatus according to the first exemplary embodiment.

FIG. 2 is a block diagram of a display apparatus 100 according to the first exemplary embodiment.

As shown in FIG. 2, the display apparatus 100 according to the second exemplary embodiment includes a communicator 110 for communicating with the exterior, a display 120 for displaying an image based on video data of a transport stream received in the communicator 110, a loudspeaker 130 for outputting a sound based on audio data of the transport stream received in the communicator 110, an input portion 140 for receiving a user's input, a storage 150 for storing data, a signal processor 160 for controlling and computing general operations of the display apparatus 100, and a central processing unit (CPU) 170 for computing and controlling operations of the signal processor 160.

In this exemplary embodiment, the CPU 170 is provided independently of the signal processor 160, but not limited thereto. Alternatively, the CPU 170 may be integrated with various chipsets such as the signal processor 160, and thus may be provided as a single system on chip (SoC).

The communicator or the signal receiver 110 receives a transport stream from various content sources or data received from the signal processor 160 to the exterior. The communicator 110 may be achieved by an assembly of communication ports or communication modules respectively corresponding to a plurality of communication standards, and its supportable protocols and communication targets are not limited to one kind or type. The communicator 110 may be achieved by a unidirectional communication method of only receiving a signal from the exterior, or by a bidirectional communication method of transmitting a signal to the exterior as well as receiving a signal from the exterior.

For example, the communicator 110 may include a radio frequency integrated circuit (RFIC), a Bluetooth module, a wireless fidelity (Wi-Fi) module or the like wireless communication module 112 for wireless network communication; an Ethernet module 113 for wired network communication; a universal serial bus (USB) port (not shown) for local connection with a USB memory (not shown) or the like; an infrared sensor (not shown) for sensing infrared if the infrared is sent from a remote controller (not shown); and so on.

In this embodiment, the communicator 110 is connected to various content sources through each of a broadcast network and a broadband network, and receives content data from the respective content sources. Here, there are various ways that the communicator 110 receives content data from the respective content sources and selectively transmits the content data to the signal processor 160. The communicator 110 includes unit modules respectively taking charge of communication with the content sources and individually inactivated by the CPU 170, and transmits content data received in an activated unit module to the signal processor 160. Alternatively, the communicator 110 may transmit the content data from the unit module designated by the CPU 170 to the signal processor 160 while the unit modules are individually receiving the content data.

However, the communicator 110 is not always connected to the broadcast network and the broadband network. Alternatively, the communicator 110 may be connected to only one of the broadcast network and the broadband network.

The display 120 displays an image based on a video signal processed by the signal processor 160. There are no limits to the types of the display 120. For example, the display 120 may be achieved by a non-emissive type such as a liquid crystal display (LCD) or a self-emissive type such as an organic light emitting diode (OLED) display panel. Further, the display 120 may include additional elements in addition to the display panel in accordance with the types of the display panel. For example, if the display 120 is achieved by the liquid crystal display, the display 130 includes a liquid crystal display (LCD) panel (not shown), a backlight unit (not shown) for emitting light to the LCD panel, and a panel driver (not shown) for driving the LCD panel (not shown).

The loudspeaker 130 outputs a sound based on an audio signal processed by the signal processor 160. The loudspeaker 130 vibrates air in accordance with an audio signal and changes air pressure to thereby make a sound. The loudspeaker 130 includes a unit loudspeaker provided corresponding to an audio signal of a certain channel. In this embodiment, the loudspeaker may include a plurality of unit loudspeakers respectively corresponding to audio signals of the plurality of channels.

There are various kinds of loudspeakers 130 in accordance with frequency bands of a sound to be output. The loudspeakers 130 include a sub-woofer corresponding to a frequency band of 20 Hz to 99 Hz, a woofer corresponding to a frequency band of 100 Hz to 299 Hz, a mid-woofer corresponding to a frequency band of 300 Hz to 499 Hz, a mid-range speaker corresponding to a frequency band of 500 Hz to 2.9 KHz, a tweeter speaker corresponding to a frequency band of 3 KHz to 6.9 KHz, and a super-tweeter speaker corresponding to a frequency band of 7 KHz to 20 KHz, in which one or more among them are selected and applied to the display apparatus 100.

The input portion 140 transmits various preset control commands or information to the CPU 170 or the signal processor 160 in accordance with a user's control or input. The input portion 140 transmits various events, which occurs by a user's control in accordance with a user's intention, to the CPU 170 or the signal processor 160.

The input portion 140 may be variously achieved in accordance with information input methods. For example, the input portion 140 may be achieved by a button placed at an outer side of the display apparatus 100, a touch screen placed in the display 120, a microphone (not shown) for receiving a user's utterance, a camera (not shown) for photographing or sensing surrounding environments of the display apparatus 100, or the like user interface provided in the display apparatus 100. The remote controller (not shown) may be also regarded as one of the user interface environments. In this case, the remote controller 60 is separated from the display apparatus 100 and transmits a control signal to the display apparatus 100 through the communicator 110.

The storage 150 stores various pieces of data under process and control of the CPU 170 and the signal processor 160. The storage 150 is accessed by the signal processor 160 and performs reading, writing, editing, deleting, updating or the like with regard to data. The storage 150 is achieved by a flash-memory, a hard-disc drive (HDD), a solid-state drive (SSD) or the like nonvolatile memory to preserve data regardless of supply of system power in the display apparatus 100.

The signal processor 160 performs various processes with regard to the transport stream received in the communicator 110. When the transport stream is received in the communicator 110, the signal processor 160 applies a video processing process to the video signal extracted from the transport stream, and outputs the processed video signal to the display 120, so that an image can be displayed on the display 120.

There is no limit to the kind of video processing process performed by the signal processor 160, and the video processing process may for example include de-multiplexing for dividing an input transport stream into sub streams such as a video signal, an audio signal and additional data, decoding corresponding to video formats of the video signal, de-interlacing for converting video data from an interlaced type into a progressive type, scaling for adjusting a video signal to have a preset resolution, noise reduction for improving image quality, detail enhancement, frame refresh rate conversion, etc.

The signal processor 160 may perform various processes in accordance with the kind and properties of a signal or data, and therefore the process of the signal processor 160 is not limited to the video processing process. Further, the data that can be processed by the signal processor 160 is not limited to data received in the communicator 110. For example, the signal processor 160 performs an audio processing process with regard to an audio signal extracted from the transport stream, and outputs such a processed audio signal to the loudspeaker 230. In addition, if a user's speech is input to the display apparatus 100, the signal processor 160 may process the speech in accordance with a preset voice recognition process. The signal processor 160 may be achieved in the form of a system-on-chip (SoC) where various functions corresponding to such processes are integrated, or an image processing board (not shown) where individual chip-set for independently performing the respective processes are mounted to a printed circuit board.

The display apparatus 200 may have specifically different hardware components in accordance with the types of the display apparatus 100 and the functions supported by the display apparatus 100. For example, a hardware component to be tuned to a certain frequency for receiving a broadcast signal may be needed if the display apparatus 100 is a TV, but may be excluded if the display apparatus 100 is a tablet PC.

Below, the signal processor 160 of when the display apparatus 100 is the TV will be described in detail.

The accompanying drawings show only basic elements of the communicator 110 and the signal processor 160, and an actual product of the display apparatus 100 includes additional elements besides the elements set forth herein.

In this exemplary embodiment, the signal processor 160 is divided into a plurality of processors 162, 163 and 164, but not limited thereto. In practice, such elements may be divided by hardware or may not be divided, or may be achieved by combination of hardware and software. Further, In this exemplary embodiment, the signal processor 160 includes a video processor 162 and an audio processor 163, but not limited thereto. Alternatively, the signal processor 160 may further include various processing modules or functions in accordance with support functions.

The communicator 110 includes a tuner 111 to be tuned to a certain frequency to receive a broadcast stream, a wireless communication module 112 for wireless communication with the exterior, and an Ethernet module 113 for wired communication with the exterior.

Further, the signal processor 160 includes a deMUX 161 for dividing the transport stream received from the signal receiver 110 into a plurality of sub signals, a video processor 162 for processing a video signal among the sub signals output from the deMUX 161 in accordance with the video processing process and outputting the processed video signal to the display 120, an audio processor 163 for processing an audio signal among the sub signals output from the deMUX 161 in accordance with the audio processing process and outputting the processed audio signal to the loudspeaker 130.

When a broadcast stream is received in the tuner 111, the tuner 111 is tuned to a frequency of a designated channel to receive a broadcast stream and converts the broadcast stream into a transport stream. The tuner 111 converts a high frequency of a carrier wave into an intermediate frequency band and converts it into a digital signal, thereby generating a transport stream. To this end, the tuner 111 has an analog/digital (A/D) converter (not shown). Alternatively, the A/D converter (not shown) may be designed to be included in not the tuner 111 but a demodulator (not shown).

The wireless communication module 112 performs wireless communication corresponding to various protocols. These protocol includes wireless fidelity (Wi-Fi), Wi-Fi Direct, Bluetooth, Universal Plug And Play (UPNP), Near Field Communication (NFC), etc. The wireless communication module 112 includes unit modules for communication based on protocols in accordance with support protocols.

Below, the foregoing protocols will be described schematically.

Wi-Fi refers to a protocol of supporting wireless local area network based on institute of electrical and electronics engineers (IEEE) 802.11 and personal area network (PAN)/local area network (LAN)/wide area network (WAN), etc. In an infrastructure mode, Wi-Fi provides wireless communication relayed by access points (AP) in between devices. In case of IEEE 802.11n, Wi-Fi guarantees the maximum transmission speed of 300 Mbps. The AP is connected to a router accessing an exterior WAN, and forms a hot spot of a predetermined range within an unclosed space. The display apparatus 100 is positioned within the hot spot around the AP and wirelessly accesses the AP, thereby connecting and communicating with a network via the AP. Here, the range of the hot spot may be expanded by additionally installing a repeater or the like device for amplifying a signal. However, it is not proper for a user to use Wi-Fi for the wireless communication while s/he is moving since the hot spot generally has a narrow range.

Wi-Fi Direct refers to a protocol which is based on peer-to-peer (P2P) and does not use the AP in Wi-Fi. Based on Wi-Fi Direct, the display apparatus 100 may directly connect and communicate with other devices without using the AP. Wi-Fi Direct guarantees the maximum transmission speed of 250 Mbps within a distance of 200 m between the devices.

Wi-Fi Direct utilizes a technique related to Ad-hoc among Wi-Fi techniques. An ad-hoc network is a communication network established with only mobile hosts without a stationary wired network. The ad-hoc network is suitable when it is difficult to establish the wired network or when it is used for a short time after establishing the network. The ad-hoc network has advantages that the network is quickly and inexpensively established since there is no limit to move the host and there is no need of a wired network and a base station. In the ad-hoc network, mobile nodes are used as not only hosts but also a kind of router, and multi-paths are set up with regard to other nodes or a path is dynamically set up. Wi-Fi Direct is a technique achieved to improve transmission speed and security by remedying the ad-hoc technique's shortcomings.

Wi-Fi Direct is fundamentally related to 1:1 connection, but 1:N connection is also possible. For instance, the display apparatus 100 has the following processes in order to connect and communicate with the mobile device or the like external device in accordance with a Wi-Fi Direct protocol. The mobile device sends a connection request message to the display apparatus 100 by a push method. If the display apparatus 100 accepts the connection request of the mobile device, a pairing is completed between the display apparatus 100 and the mobile device.

Bluetooth is a direct communication method between devices based on IEEE 802.15.1 standards. Bluetooth uses an industrial scientific and medical (ISM) frequency of 2400 to 2483.5 MHz. However, to prevent interference with other systems using higher and lower frequencies, Bluetooth employs total 79 channels of 2402 to 2480 MHz except a band as much as 2 MHz after 2400 MHz and a band as much as 3.5 MHz before 2483.5 MHz.

Since many systems use the same frequency band, electromagnetic interference is likely to occur between the systems. To prevent this, Bluetooth employs a frequency hopping technique. The frequency hopping technique is to transmit a packet (data) little by little while moving in many channels quickly in accordance with certain patterns. Bluetooth hops over 79 assigned channels 1600 times per second. Communication is accomplished when this hopping pattern is synchronized between Bluetooth devices. Since Bluetooth devices are connected as a master and a slave, the communication is not achieved between the two devices if the slave device is not synchronized with frequency hopping generated by the master device. Therefore, stable connection is expected without electromagnetic interferences with other systems. For reference, one master device can connect with up to seven slave devices. Here, communication between the master device and the slave device is possible, but communication between the slave devices is impossible. However, the roles of the master and the slave may be exchangeable with each other according to situations since they are not fixed.

UPNP is a protocol for connecting devices by a P2P method in accordance with digital living network alliance (DLNA). UPNP utilizes the existing protocols such as Internet protocol, tape carrier package (TCP), user datagram protocol (UDP), hypertext transfer protocol (HTTP), and extensible mark-up language (XML). UPNP is based on a wire protocol, in which information exchanged between devices is represented in the XML and communicated through the HTTP.

Wi-Fi, Bluetooth or the like protocol uses 48-bit media access control (MAC) address as a unique identifier of a communication module, whereas UPNP uses an identifier of universally unique identifier (UUID). UUID is an identifier of 16 octets, i.e. 128 bits, and is represented by 32 lowercase hexadecimal digits. UUID is a set of 32 characters or digits, represented by four hyphens, and has a total 36-digit number of "8-4-4-4-12".

NFC is one of radio-frequency identifications (RFID), which is a contactless short-range wireless communication protocol using a frequency band of 13.56 MHz. NFC is a technique to exchange data between devices at a near distance of about 10 cm, which is extended from ISO/IEC 14443. NFC operates based on electromagnetic induction between two adjacent loop antennas within a magnetic field.

NFC supports two modes of a passive communication mode and an active communication mode. In the passive communication mode, a starting device provides a carrier field, and a target device operates while modulating the provided fields. The target device of the passive communication mode acquires operation power from the electromagnetic field provided by the starting device, and thus the target device also serves as a transceiver. By the way, in the active communication mode, both the starting device and the target device communicate with each other by generating electric fields in itself. In the active communication mode, one device releases its own electromagnetic field until receiving data from an opponent, and activates its own electromagnetic field when transmitting data to the opponent.

Below, elements of the signal processor 160 will be described.

The deMUX (or demultiplexer) 161 performs a reverse operation of the multiplexer (not shown). That is, the deMUX 161 connects one input terminal with a plurality of output terminals, and distributes a stream input to the input terminal to the respective output terminals in accordance with selection signals. For example, if there are four output terminals with respect to one input terminal, the deMUX 161 may select each of the four output terminals by combination of selection signals having two levels of 0 and 1. In a particular case where the deMUX 161 is applied to the display apparatus 200, the deMUX 161 divides the transport stream received from the tuner 111 into the sub signals of a video signal and an audio signal and outputs them to the respective output terminals.

The deMUX 161 may use various methods to divide the transport stream into the sub signals. For example, the deMUX 161 divides the transport stream into the sub signals in accordance with packet identifiers (PID) given to packets in the transport stream. The sub signals in the transport stream are independently compressed and packetized according to channels, and the same PID is given to the packets corresponding to one channel so as to be distinguished from the packets corresponding to another channel. The deMUX 161 classifies the packets in the transport stream according to the PID, and extracts the sub signals having the same PID.

The video processor 162 decodes and scales the video signal output from the deMUX 161 and outputs it to the display 120. To this end, the video processor 162 includes a decoder (not shown) that returns the video signal to a state before an encoding process by performing an opposite process to the encoding process with regard to the video signal encoded by a certain format, and a scaler (not shown) that scales the decoded video signal in accordance with the resolution of the display 120 or a separately designated resolution. If the video signal output from the deMUX 161 is not encoded by a certain format, i.e. not compressed, the decoder (not shown) of the video processor 162 does not process this video signal.

The audio processor 163 amplifies an audio signal output from the deMUX 161 and outputs the amplified audio signal to the loudspeaker 130. To this end, the audio processor 163 includes a digital signal supplier (not shown) for outputting a digital audio signal; a pulse width modulation (PWM) processor (not shown) for outputting a PWM signal based on a digital signal output from the digital signal supplier (not shown), an amplifier (not shown) for amplifying the PWM signal output from the PWM processor (not shown), and an LC filter (not shown) for filtering the PWM signal amplified by the amplifier (not shown) by a predetermined frequency band to thereby demodulate the PWM signal.

The CPU 170 is an element for performing central calculation to operate general elements in the signal processor 160, and plays a central role in basically parsing and calculating data. The CPU 170 internally includes a processor register (not shown) in which commands to be processed are stored; an arithmetic logic unit (ALU) (not shown) being in charge of comparison, determination and calculation; a control unit (not shown) for internally controlling the CPU 170 to analyze and carry out the commands; an internal bus (not shown), a cache (not shown), etc.

The CPU 170 performs calculation needed for operating the elements of the signal processor 160, such as the deMUX 161, the video processor 162 and the audio processor 163. Alternatively, some elements of the signal processor 160 may be designed to operate without the data calculation of the CPU 170 or operate by a separate microcontroller (not shown).

With this structure, the display apparatus 100 processes a video signal received from the image source and displays an image. By the way, an image channel or content may be switched in the video signal as time passes even though the display apparatus 100 displays an image by continuously receiving a video signal from one image source without changing the image source.

In this case, the image source inserts a null frame for indicating a switch of content between video frames of the video signal to be transmitted.

Figure 3:
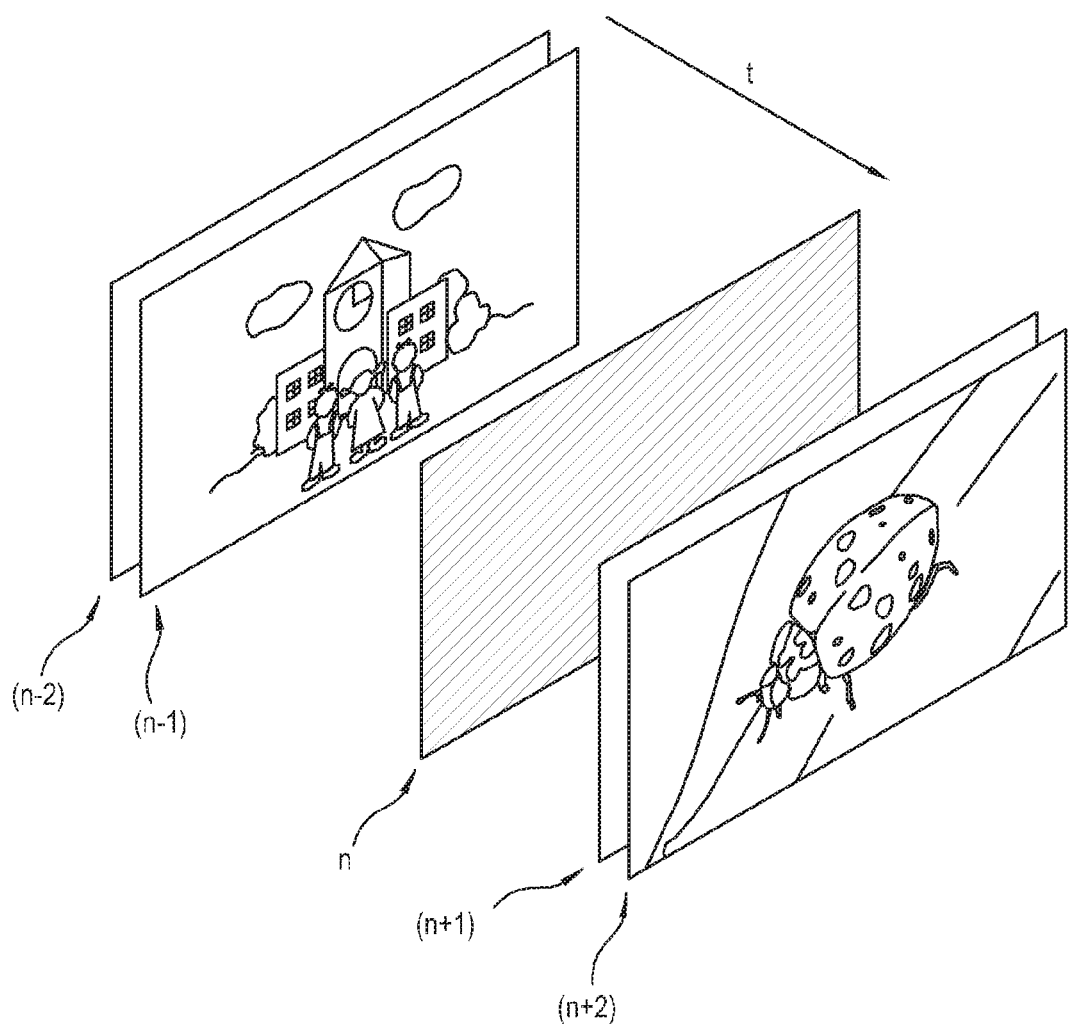
FIG. 3 illustrates that a null frame is inserted between video frames in a video signal provided to the display apparatus according to the first exemplary embodiment.

FIG. 3 illustrates that a null frame is inserted between video frames in a video signal provided to the display apparatus according to the first exemplary embodiment.

As shown in FIG. 3, the video signal transmitted from the image source to the display apparatus includes a plurality of video frames arranged in order of time. The video frames shown in FIG. 3 includes video frames (n−2), (n−1), n, (n+1), (n+2) in order of time. That is, the video frame (n−2) among these video frames is first displayed in the display apparatus, and the video frame (n+2) is last displayed in the display apparatus.

For example, suppose that the image source provides content to the display apparatus by switching over from first content to second content as time passes. The video frames corresponding to an image of the first content are (n−2) and (n−1), and the video frames corresponding to an image of the second content are (n+1) and (n+2). Each video frame includes image information of the corresponding content.

The image source inserts a null frame n for indicating the switch from the first content to the second content and distinguishing the video frame between pieces of content. The null frame is arranged in between the last video frame (n−1) of the first content and the first video frame (n+1) of the second content in terms of time. In this exemplary embodiment, the null frame is one, but not limited thereto. Alternatively, there may be a plurality of null frames. It is possible to cope with the plurality of null frames equivalently to the case of one null frame.

If the display apparatus senses such a null frame while processing each video frame to displaying an image, it is determined that the previous content and the following content are different from each other with respect to the null frame. That is, the display apparatus determines that the content is switched, by sensing the null frame.

If it is determined that a content switch event occurs, the display apparatus performs various preset operations in response to the corresponding event. There are many examples of such operations, and details thereof will be described later.

The null frame does not contain video information about content, and is visually easily distinguishable from the video frame of the content. Therefore, the null frame is basically achieved by a frame having a single color without containing any special image information. That is, the null frame is a frame having only one color information. For example, the null frame may be a full black frame. However, the color of the null frame is not limited to black. Alternatively, the null frame may have various colors such as gray, blue, red, etc. Such a single color for forming the null frame will be called a dominant color.

Of course, general color distribution for the video frame shows one color most that has been the most used for the video frame. However, the term of dominant color in this exemplary embodiment is not used for the video frame of general content. In this exemplary embodiment, the dominant color refers to a single color of forming the null frame under the condition that the video frame is the null frame.

Figure 4:
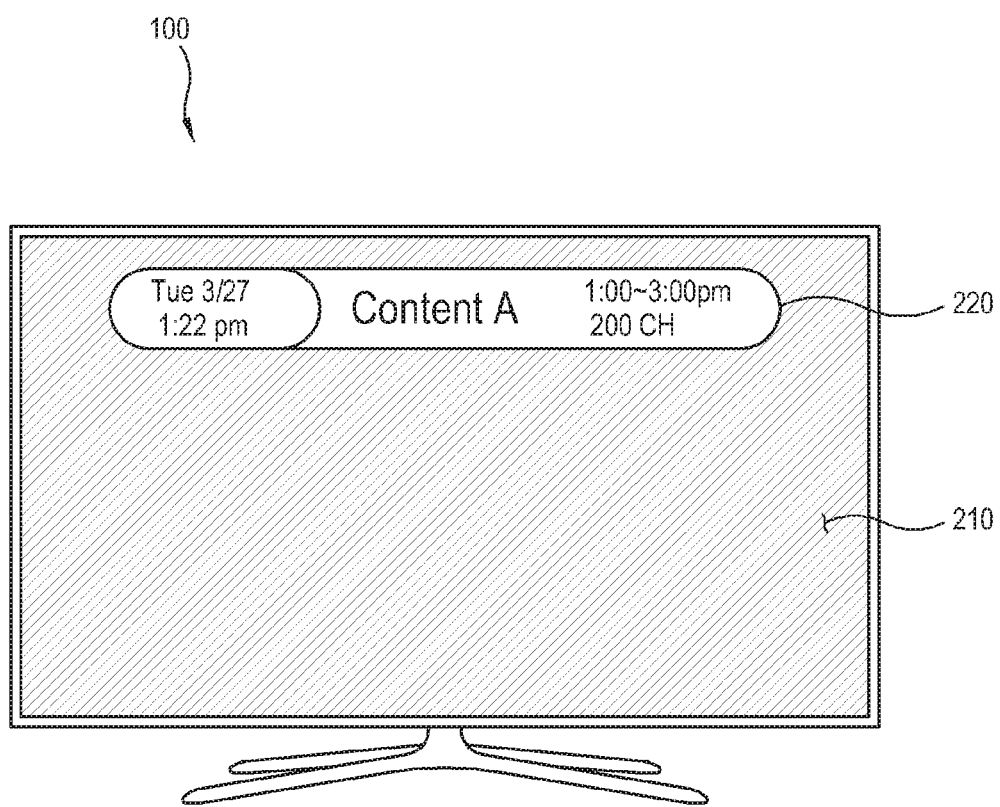
FIG. 4 illustrates that the display apparatus according to the first exemplary embodiment displays an on-screen display (OSD) on the null frame.

FIG. 4 illustrates that the display apparatus 100 according to the first exemplary embodiment displays an on-screen display (OSD) 220 on the null frame 210.

As shown in FIG. 4, the display apparatus 100 processes a video signal received from the image source and displays a null frame 210 among a plurality of video frames in the video signal. At this time, while the null frame 210 is displayed, an additional user interface (UI) or on-screen display 220 may be displayed on the null frame 210.

The OSD 220 may be generated by the display apparatus 100 in response to a certain event, or may be provided by the image source.

If only the null frame 210 is displayed, the display apparatus 100 may determine a frame having only color information corresponding to the dominant color as the null frame 210.

By the way, if the OSD 220 is overlaid on the null frame 210 even though the null frame 210 in the video signal provided from the image source is basically formed by a certain dominant color, color information is added due to the OSD 220. Therefore, if both the null frame 210 and the OSD 220 are displayed together, the display apparatus 100 cannot determine the null frame by the method of sensing the frame formed by only the color information of the dominant color.

Below, some methods of sensing the null frame in the display apparatus will be described.

Figure 5:
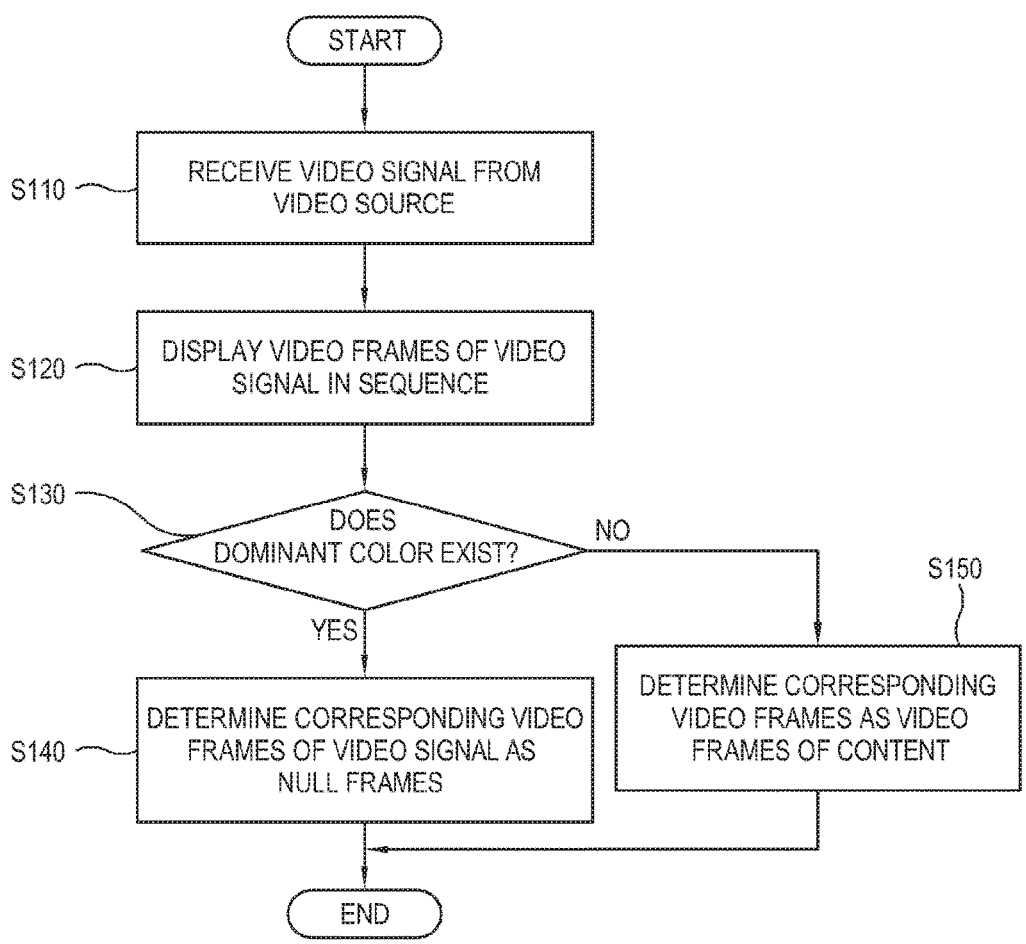
FIG. 5 is a flowchart that a display apparatus according to a second exemplary embodiment senses a null frame in a plurality of video frames.

FIG. 5 is a flowchart that a display apparatus according to a second exemplary embodiment senses a null frame in a plurality of video frames.

As shown in FIG. 5, at operation S110 a display apparatus according to the second exemplary embodiment receives a video signal from an image source.

At operation S120 the display apparatus processes a video signal and sequentially displays video frames of the video signal as time passes.

At operation S130 the display apparatus determines whether there is a video frame formed by a single color, i.e., whether there is a dominant color.

If it is determined that a certain video frame has the dominant color, at operation S140 the display apparatus determines that this video frame as the null frame.

On the other hand, if it is determined that a certain video frame has no dominant color, at operation S150 the display apparatus determines this video frame as a video frame of content.

For example, the display apparatus determines whether the number of pixels having the single color among the pixels included in the certain video frame is greater than a preset threshold. If the number of pixels having the single color is greater than the threshold in the certain video frame, the display apparatus regards that the dominant color exists in this video frame, and determines this video frame as the null frame.

In this manner, the display apparatus can determine whether a certain video frame is a null frame or not.

By the way, as described above with reference to FIG. 4, if the OSD is overlaid on the null frame, it is not easy to sense the null frame by only the method of determining the presence of the dominant color.

Thus, the display apparatus may employ a method of selecting a preset area in the video frame and determining the presence of the dominant color within the selected area. Below, this exemplary embodiment will be described.

Figure 6:
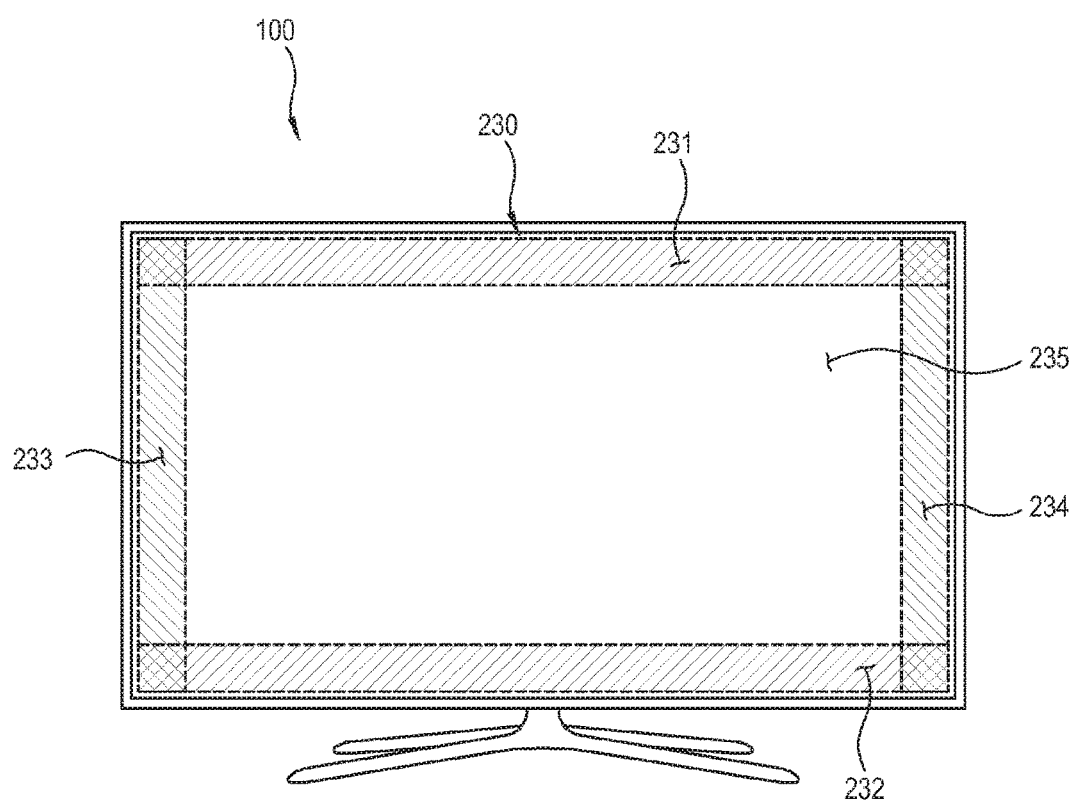
FIG. 6 illustrates an area where an OSD is displayable in a display apparatus according to a third exemplary embodiment.

FIG. 6 illustrates an area where an OSD is displayable in a display apparatus 100 according to a third exemplary embodiment;

As shown in FIG. 6, the display apparatus 100 according to the third exemplary embodiment has a full display area 230 for displaying an image. The full display area 230 refers to the maximum effective area where an image can be displayed.

In general, the display apparatus 100 displays the OSD in an area where interference with a content image is as less as possible. That is, the area for displaying the OSD may be a side area in the full display area 230, for example one of an upper side area 231, a lower side area 232, a left side area 233 and a right side area 234.

In the full display area 230, a central area 235 is surrounded with the upper side area 231, the lower side area 232, the left side area 233 and the right side area 234. The central area 235 is larger than each of the upper side area 231, the lower side area 232, the left side area 233 and the right side area 234. The central area 235 generally displays a major scene of content, and therefore the OSD is not typically displayed on the central area 235 except in a special case.

If the OSD is displayed on the null frame, it is expected that the OSD is displayed on at least one among the upper side area 231, the lower side area 232, the left side area 233 and the right side area 234. Therefore, the display apparatus 100 selects at least an area of the central area 235, which is not expected to display the OSD, as a target area in a certain video frame, and determines whether there is the dominant color in this target area, thereby sensing the null frame.

Since the area expected to display the OSD is excluded in the video frame, the display apparatus 100 in this exemplary embodiment can sense the null frame overlaid with the OSD.

Figure 7:
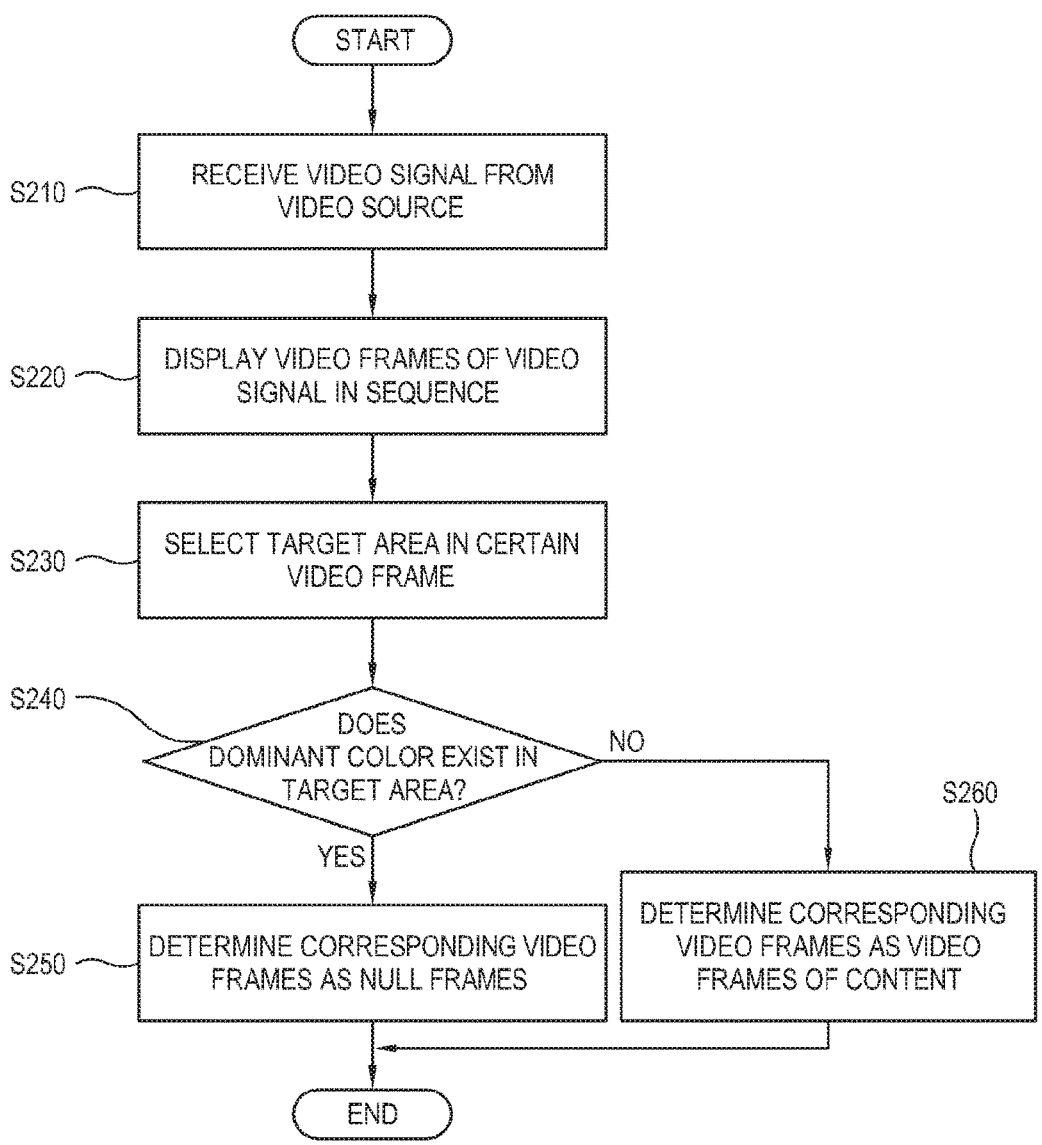
FIG. 7 is a flowchart that the display apparatus according to the third exemplary embodiment senses a null frame in a plurality of video frames.

FIG. 7 is a flowchart that the display apparatus according to the third exemplary embodiment senses a null frame in a plurality of video frames.

As shown in FIG. 7, at operation S210 the display apparatus according to the third exemplary embodiment receives a video signal from an image source.

At operation S220 the display apparatus processes the video signal and sequentially displays video frames of the video signal as time passes.

At operation S230 the display apparatus selects a preset partial area in a certain video frame as the target area. The target area may include areas corresponding to various positions within the video frame. For example, the central area 235 (see FIG. 5) may be selected. Further, the target area may have various sizes. For example, the target area may be the whole or a part of the central area 235 (see FIG. 5).

At operation S240 the display apparatus determines whether the target area of the certain video frame is formed by only a single color, i.e. whether the dominant color exists in the target area.

If it is determined that the dominant color exists in the target area, at operation S250 the display apparatus determines this video frame as the null frame.

On the other hand, if it is determined that the dominant color does not exist in the target area, at operation S260 the display apparatus determines this video frame as a video frame of content.

By the way, such a method of sensing the null frame by selecting and analyzing the target area may have the following problems.

Figure 8:
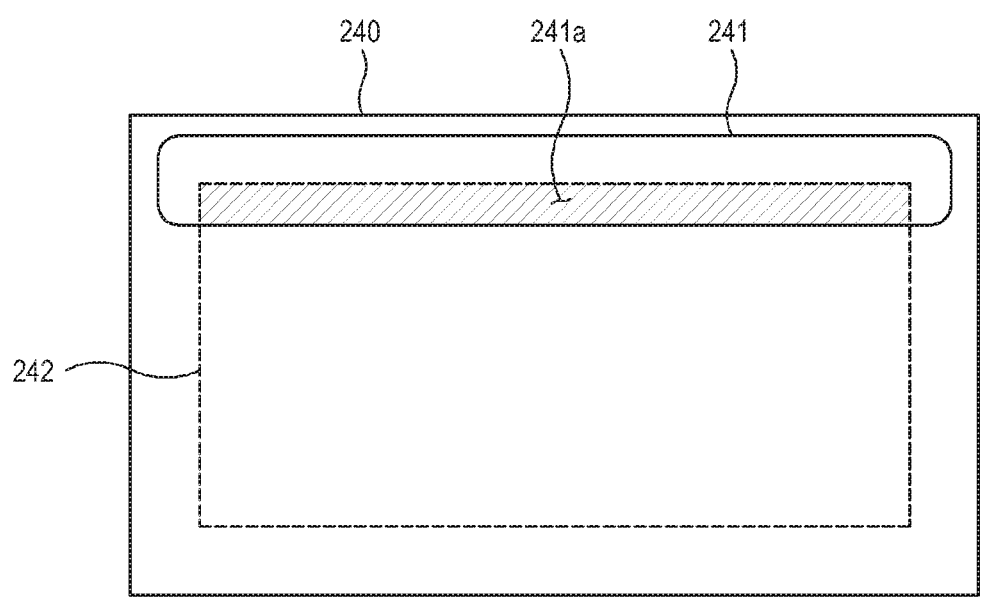
FIG. 8 illustrates that a target area is set in the display apparatus according to the third exemplary embodiment.

FIG. 8 illustrates that a target area 242 is set in the display apparatus according to the third exemplary embodiment.

As shown in FIG. 8, the display apparatus may set the target area 242 to include the central area instead of the upper, lower, left and right side areas within the full display area 240 of the video frame. Here, the full display area 240 of the video frame may have various sizes and ratios, and the position and size of an OSD 241 may be not limited to specific values. Therefore, distinguishment between the side area and the central area within the full display area 240 is not limited by a certain value.

Although the OSD 241 is displayed on one among the upper, lower, left and right side areas, a partial area 241a of the OSD 241 may be displayed within the target area 242. In this case, the target area 242 includes color information of the area 241a in addition to the dominant color of the full display area 240, and therefore the percentage of the single color in the target area 242 is not significantly high enough to exceed the preset threshold.

Therefore, since it is determined in this case as if the dominant color does not exist in the target area 242, the display apparatus cannot sense this video frame as the null frame.

Further, the display apparatus is likely to sense a video frame of content as the null frame by mistake. Such a case will be described below.

Figure 9:
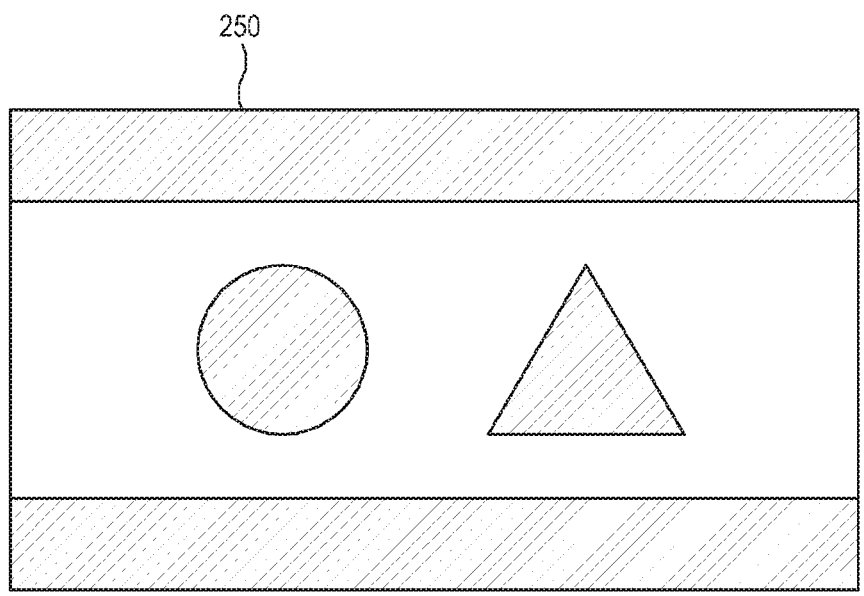
FIG. 9 illustrates a certain video frame of content displayed in the display apparatus according to the third exemplary embodiment.

FIG. 9 illustrates a certain video frame 250 of content displayed in the display apparatus according to the third exemplary embodiment.

As shown in FIG. 9, the video frame 250 of content displayed by the display apparatus may include a dark scene. This case is likely to occur when the content is a movie. When the video frame 250 corresponds to a dark scene, it may be sensed that a black dominant color exists in this video frame 250. Therefore, if the null frame is sensed based on only the presence of the dominant color, the display apparatus may make a mistake of determining the video frame of the content as the null frame even though the video frame 250 actually corresponds to content.

Likewise, the null frame basically involves the dominant color, but it may be determined by mistake that the actual null frame is not a null frame if the null frame is overlaid with the OSD. Further, the dominant color may be sensed in the video frame of content, and it is therefore determined by mistake that a video frame, which is not actually the null frame, is the null frame.

Therefore, to make the display apparatus more exactly determine whether a certain video frame is the null frame or not, there is a need of a more improved determination method than those of the foregoing exemplary embodiments. In this regard, exemplary embodiments will be described below.

Figure 10:
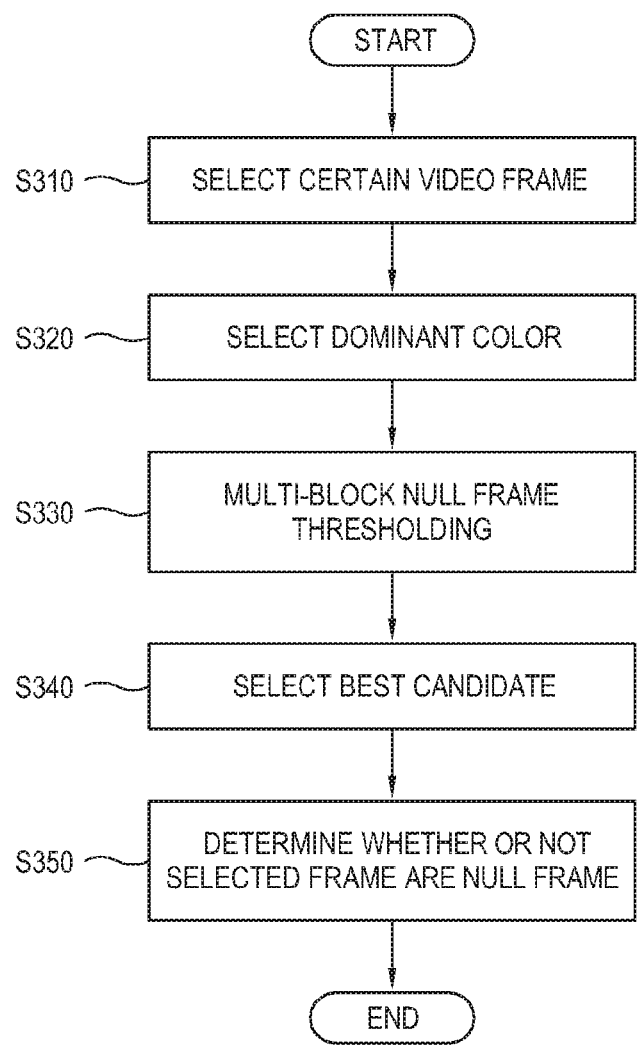
FIG. 10 is a flowchart that a display apparatus according to a fourth exemplary embodiment determines whether a certain video frame is a null frame.

FIG. 10 is a flowchart that a display apparatus according to a fourth exemplary embodiment determines whether a certain video frame is a null frame.

As shown in FIG. 10, the display apparatus needs a method of exactly determining whether a certain video frame is the null frame or not, and a main idea of this method is as follows.

First, the null frame is basically formed by a single color, i.e. the dominant color exists in the null frame. If the OSD is overlaid on the null frame, colors of the OSD are generally different from the dominant color. Distribution of colors forming the OSD is not uniform throughout the video frame. In other words, these colors are more densely distributed in a certain area of the video frame.

Based on this idea, the display apparatus in this embodiment employs the following method to determine whether a certain video frame is the null frame or not.

At operation S310 the display apparatus selects a certain video frame to be determined among the plurality of video frames.

At operation S320 the display apparatus implements a process of selecting the dominant color to determine the dominant color in the selected video frame. In detail, the display apparatus determines whether the dominant color exists in this video frame, and determines what color the dominant color is. In general cases, most of null frames have black dominant color. However, in some cases, the dominant color may be gray, white or blue. To fine the dominant color, the display apparatus may for example use a color histogram.

At operation S330 the display apparatus performs a process of multi-block null frame thresholding. In this process, the display apparatus divides the whole video frame into a plurality of areas. The whole video frame will be called a full frame, and the plurality of areas divided from the full frame will be called sub frames. There are no limits to the number of sub frames divided from the full frame, but the respective sub frames are divided to have the same area from the full frame. The display apparatus determines each sub frame is the null frame, and distinguishes between the sub frames corresponding to the null frame and the sub frames not corresponding to the null frame in accordance with the determination results.

At operation S340 the display apparatus selects the best candidate. In this operation, the display apparatus extracts the sub frames determined as the null frame among the plurality of sub frames, and draws the biggest rectangle that can be formed by only the extracted sub frames. That is, in the display apparatus, the biggest rectangle among the rectangles that can be formed by the sub frames determined as the null frame is selected as the best candidate.

At operation S350 the display apparatus determines whether the video frame is the null frame. In this operation, the display apparatus determines whether the video frame is the null frame based on the best candidate selected in the operation S340.

In this manner, the display apparatus can easily sense the null frame even though it includes the OSD.

Below, the foregoing operations for determining the null frame will be described in more detail.

FIG. 11 shows a programming code for drawing a color histogram of a video frame in the display apparatus according to the fourth exemplary embodiment.

As shown in FIG. 11, the display apparatus has a programming code 310 for selecting a certain video frame and deducing a color histogram that shows color distribution within this video frame.

The programming codes shown in FIG. 11 and the following accompanying drawings are codes for executing sub stages for sensing the null frame in the display apparatus. The format and type of the programming code applied to perform a certain function in the display apparatus may vary depending on program languages. Therefore, such programming codes are nothing but an example, and detailed codes do not limit the present inventive concept. Further, the function, variables and constants in the programming code may be varied as long as they can play the roles of this programming code.

Further, the programming codes described in this example embodiment schematically shows only partial content related to a specific function among all the codes for sensing the null frame. Therefore, the programming code may include additional content to be applied to a real product.

In accordance with the programming code 310, the display apparatus can draw a histogram by determining which value each pixel has among pixel values from 0 to 255 with respect to pixels that constitute the video frame. The histogram visually shows how many pixels have a certain pixel value.

FIG. 12 shows a programming code for drawing a maximum value from the histogram in the display apparatus according to the fourth exemplary embodiment;

As shown in FIG. 12, the display apparatus has a programming code 320 for calculating the maximum value of color in the color histogram. This programming code 320 is provided to calculate a color value the most pixels has, within a pixel value range of 0 to 255.

In accordance with the programming code 320, the display apparatus specifies the dominant color within the video frame.

Figure 13:
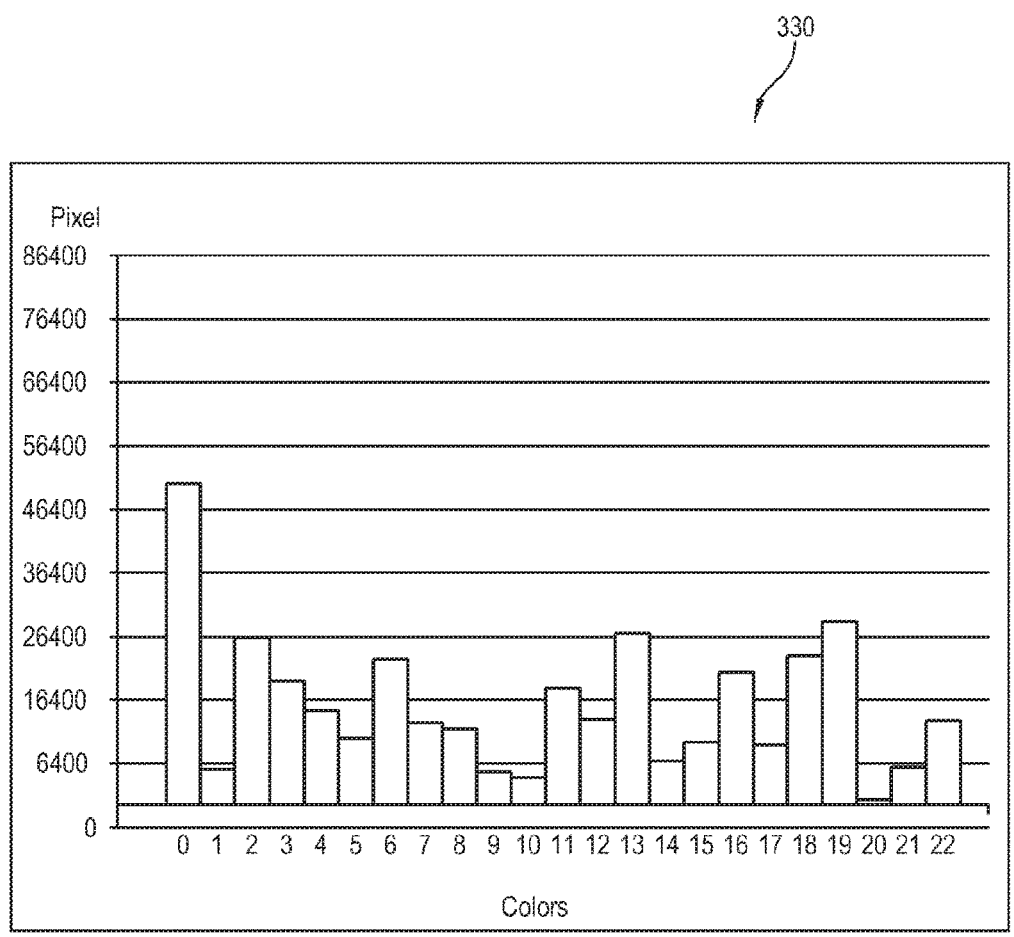
FIG. 13 illustrates the color histogram that can be drawn in accordance with the programming codes of FIG. 11 and FIG. 12.

FIG. 13 illustrates the color histogram 330 that can be drawn in accordance with the programming codes of FIG. 11 and FIG. 12;

As shown in FIG. 13, the display apparatus calculates the color value of each pixel within the video frame, and draws the color histogram 330 showing the numbers of pixels corresponding to each color in the video frame.

In the color histogram 330, a horizontal axis indicates serial numbers of colors. The respective serial numbers are given for convenience to distinguish among colors, and a certain number does not match with a certain color. Further, a vertical axis of the color histogram 330 indicates the number of pixels within the video frame. The color histogram 330 shows distribution of colors, and therefore a color having the highest value in the vertical axis shows the highest percentage.

In the color histogram 330 shown in FIG. 13, the video frame includes a total of 22 pieces of color information. Among them, 46,400 or more pixels correspond to a color of '0', and thus the color of '0' is the most distributed in the video frame. Next, 26,400 or more pixels correspond to a color of '19', and thus the color of '19' is the second most distributed in the video frame. That is, it will be understood that the color of '0' is the dominant color in the video frame.

Figure 14:
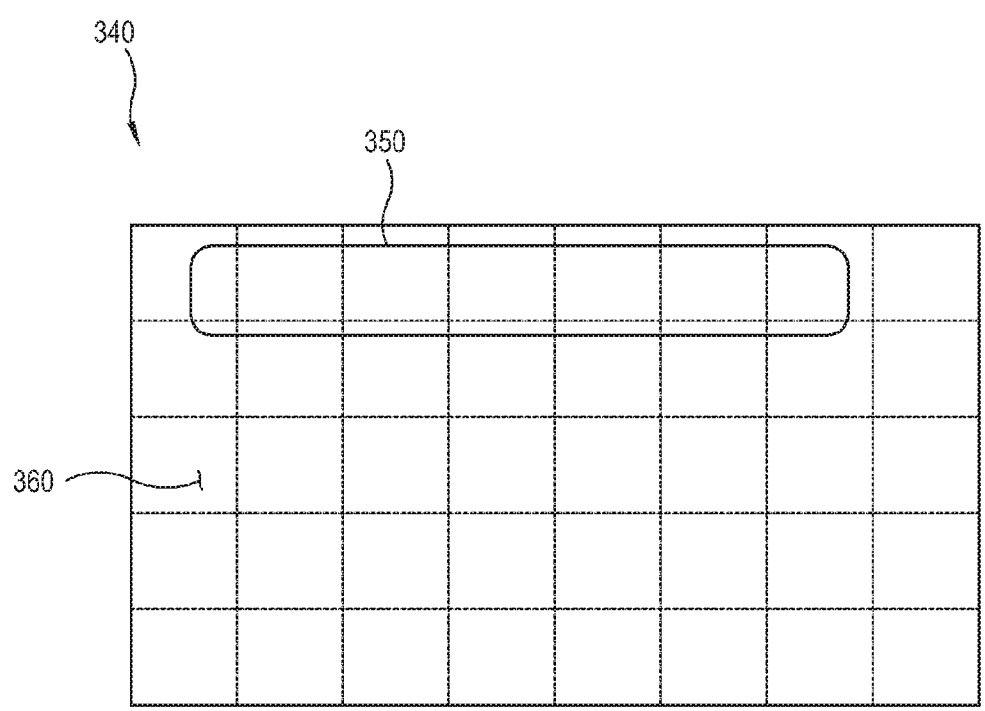
FIG. 14 illustrates that the display apparatus according to the fourth exemplary embodiment divides the video frame into a plurality of sub frames.

FIG. 14 illustrates that the display apparatus according to the fourth exemplary embodiment divides a video frame 340 into a plurality of sub frames 360.

As shown in FIG. 14, the display apparatus divides the video frame 340 into the plurality of sub frame 360. The display apparatus divides each of horizontal and vertical edges of the video frame 340 by a preset number. Here, there are no limits to the horizontal division number and the vertical division number since they may be varied depending on various processing environments. In FIG. 14, the video frame 340 is divided into a total of 40 sub frames 360 in matrix of 5×8. However, this is nothing but an example, and there are no limits to the number of sub frames 360.

However, if the video frame 340 is divided to get more sub frames 360, accuracy of sensing the null frame becomes higher but a processing load increases. On the other hand, if the video frame 340 is divided to get fewer sub frames 360, the accuracy of sensing the null frame becomes lower but the processing load decreases. The number of sub frames 360 is variously determined taking these conditions and device environments into account. The sub frame 360 is shaped like a rectangle or square, and each sub frame 360 has the same area.

The video frame 340 is divided without considering what video information the video frame 340 contains. For example, the display apparatus divides the video frame 340 into the sub frames 360 by a preset number and areas, regardless of the OSD 350 overlaid on the video frame 340.

FIG. 15 illustrates a programming code for determining whether each sub frame is a null frame in the display apparatus according to the fourth exemplary embodiment.

As shown in FIG. 15, the display apparatus has a programming code 370 for determining whether each sub frame divided from the video frame is the null frame or not. In this programming code 370, it is determined whether each sub frame is the null frame, and the sub frames determined as the null frame is assigned with a value of '1' and the sub frames determined as not the null frame is assigned with a value of '0'. A criterion for determining whether the sub frame is defined in the value of 'kDensityPercent' of the programming code 370. Although details are not shown in this programming code 370, assignment of '0' or '1' based on the value of 'kDensityPercent' is processed by the function of 'caculateDensity'.

For example, the display apparatus determines whether the dominant color exists in the sub frame, and determines whether the dominant color of the sub frame is equal to the dominant color of the full frame. If the dominant color does not exist in the sub frame or if the dominant color of the sub frame is different from the dominant color of the full frame even though the dominant color exists in the sub frame, the display apparatus determines that this sub frame is not the null frame. On the other hand, if the dominant color of the sub frame is equal to the dominant color of the full frame, the display apparatus determines that this sub frame is the null frame.

That is, the display apparatus determines that the sub fame corresponds to the null frame if the sub frame has information about only the single color corresponding to the dominant color of the video frame.

Although the sub frame is the null frame, the sub frame may have information about other colors than the dominant color due to noise and the like various factors. In this case, if a percentage of certain color information in the sub frame exceeds a preset threshold, the display apparatus may determine that this color information is of the dominant color in the sub frame and the sub frame involves the single color information.

Figure 16:
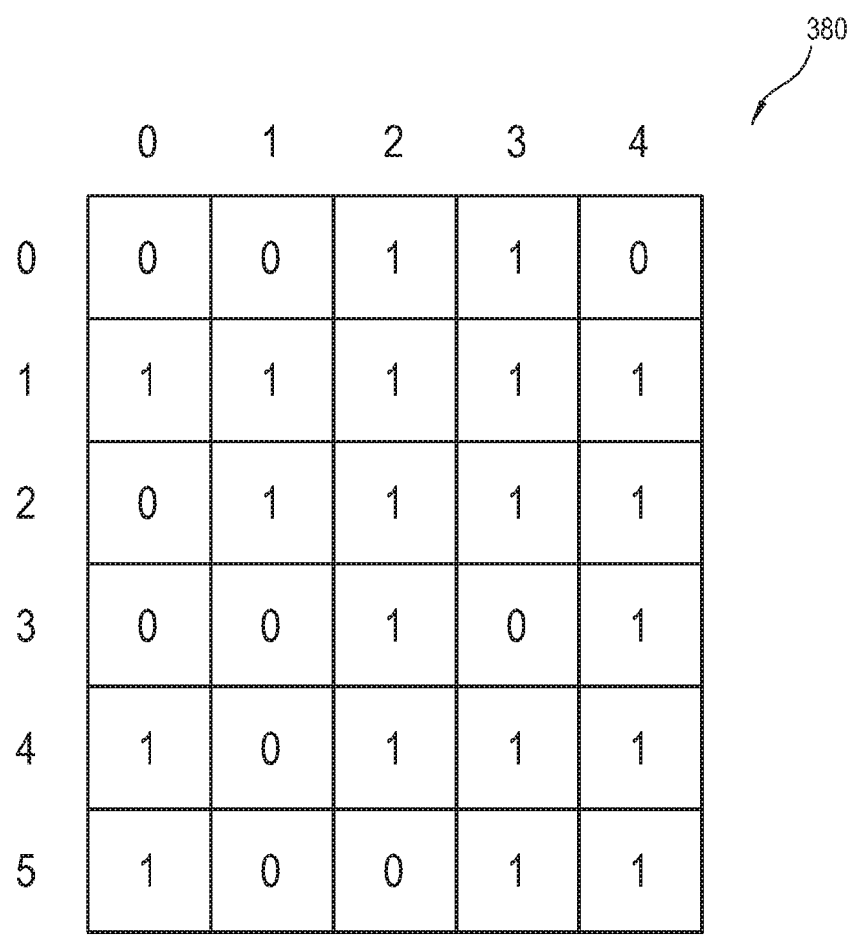
FIG. 16 illustrates that the display apparatus according to the fourth exemplary embodiment determines whether each sub frame is the null frame and assigns identification values to the sub frames.

FIG. 16 illustrates that the display apparatus according to the fourth exemplary embodiment determines whether each sub frame 380 is the null frame and assigns identification values to the sub frames;

As shown in FIG. 16, the display apparatus may for example divides the full frame into a total of 30 sub frames 380 in the form of a matrix of 6×5. The display apparatus determines whether each sub frame 380 is the null frame, and assigns a value of '1' to the sub frame 380 determined as the null frame and a value of '0' to the sub frame 380 determined as not the null frame.

Referring to FIG. 16, among the total of 30 sub frames 380, 20 sub frames 380 corresponding to (0,2), (0,3), (1,0), (1,1), (1,2), (1,3), (1,4), (2,1), (2,2), (2,3), (2,4), (3,2), (3,4), (4,0), (4,2), (4,3), (4,4), (5,0), (5,3) and (5,4) are determined as the null frame, and the other sub frames 380 are determined as not the null frame.

After determining whether each sub frame 380 is the null frame or not, the display apparatus deduces "the biggest continuous rectangle" formed by only the sub frames 380 determined as the null frame. "The biggest continuous rectangle" refers to "the best candidate" described in the operation S340 of FIG. 10.

There may be many ways of setting what range the biggest continuous rectangle is deduced throughout the video frame.

For example, the display apparatus determines the biggest continuous rectangle within each row. In this manner, the display apparatus calculates the maximum area of a continuous rectangle deduced in each row, and the rectangle having the maximum area among the rectangles deduced with respect to the respective rows is determined as the best candidate.

For example, in terms of the maximum area of the continuous rectangle of each row, the continuous rectangle in the row of '0' includes two sub frames 380 of (0,2) and (0,3); the continuous rectangle in the row of '1' includes five sub frames 380 of (1,0), (1,1), (1,2), (1,3) and (1,4); the continuous rectangle in the row of '2' includes four sub frames 380 of (2,1), (2,2), (2,3) and (2,4), the continuous rectangle in the row of '3' includes one sub frames 380 of (3,2) or (3,4); the continuous rectangle in the row of '4' includes three sub frames 380 of (4,2), (4,3) and (4,4); and the continuous rectangle in the row of '5' includes two sub frames 380 of (5,3) and (5,4).

Among them, the biggest continuous rectangle is the row of '1' including five sub frames 380. Thus, the display apparatus selects this rectangle as the best candidate.

Alternatively, the display apparatus determines the biggest continuous rectangle within each column. In this manner, the display apparatus calculates the maximum area of the continuous rectangle deduced in each column, and determines the rectangle having the maximum area among the rectangles respectively deduced in the columns as the best candidate. In this case, the biggest continuous rectangle is the rectangle including five sub frames 380 of (0,2), (1,2), (2,2), (3,2) and (4,2) or the rectangle including five sub frames 380 of (1,4), (2,4), (3,4), (4,4) and (5,4).

Like this, if there are a plurality of biggest continuous rectangles having the same area, the display apparatus may select one of them with respect to a preset reference. For example, the display apparatus may select a rectangle closer to the central area. In this regard, the rectangle including five sub frames 380 of (0,2), (1,2), (2,2), (3,2) and (4,2) is selected as the best candidate.

Alternatively, the display apparatus determines the biggest continuous rectangle throughout the full frame without limiting the range of the row or column. In this case, the biggest continuous rectangle is a rectangle including eight sub frames 380 of (1,1), (1,2), (1,3), (1,4), (2,1), (2,2), (2,3) and (2,4).

Like this, there may be many methods of selecting the biggest continuous rectangle. The reason why the rectangular shape is selected as the best candidate is because processing speed and load are relatively reduced.

An algorithm for determining the biggest continuous rectangle may include dynamic programming. The dynamic programming refers to a method of defining a numerical progression based on a relationship between an adjacent term and the current term in accordance with definition of a function of using natural number as variables. In the dynamic programming, a given program is divided into many sub problems, and is processed using answers obtained after processing the sub problems. When the sub problems are processed, the same sub problems may be repetitively processed. At this time, the answers of the sub problems are stored, and it is thus easy to directly obtain the answers of the repetitive sub problems, thereby rapidly speeding up the process.

Figure 17:
FIG. 17 illustrates a programming code for making each sub frame be weighted by dynamic programming in the display apparatus according to the fourth exemplary embodiment.

FIG. 17 illustrates a programming code 390 for making each sub frame be weighted by dynamic programming in the display apparatus according to the fourth exemplary embodiment.

FIG. 18 illustrates a programming code 400 for finding the biggest continuous rectangle in the state that each sub frame is weighted based on the programming code of FIG. 17.

As shown in FIG. 17 and FIG. 18, the display apparatus includes the programming code 390 for accumulating the values of the last sub frames as the sub frames assigned with the value of '1' are row-wise continued with respect to the plurality of sub frames divided in the form of a matrix assigned with values of '0' or '1', and the programming code

400 for finding out the biggest continuous rectangle in accordance with the accumulation results.

That is, if a first sub frame is assigned with a value of '1' and a second sub frame adjacent to the first sub frame is assigned with a value of '1' among the row-wise arranged sub frames, the display apparatus assigns a value of '2' to the second sub frame in a meaning that two sub frames are continued. In addition, if a third sub frame adjacent to the second sub frame is assigned with a value of '1', the display apparatus assigns a value of '3' to the third sub frame in a meaning that three sub frames are continued. The display apparatus does not change the value for the sub frame assigned with a value of '0'.

In such a manner that the sub frames are weighted, the display apparatus deduces the biggest continuous rectangle with respect to the sub frame which is the highest weighted.

In the programming codes 390 and 400, dp[i][j] refers to the length of continuous sub frames having the values of '1' ended in the row of 'i' and the column of 'j'. Thus, it is possible to deduce the biggest continuous rectangle among the rectangles formed by only the sub frames having the values of '1'.

Figure 19:
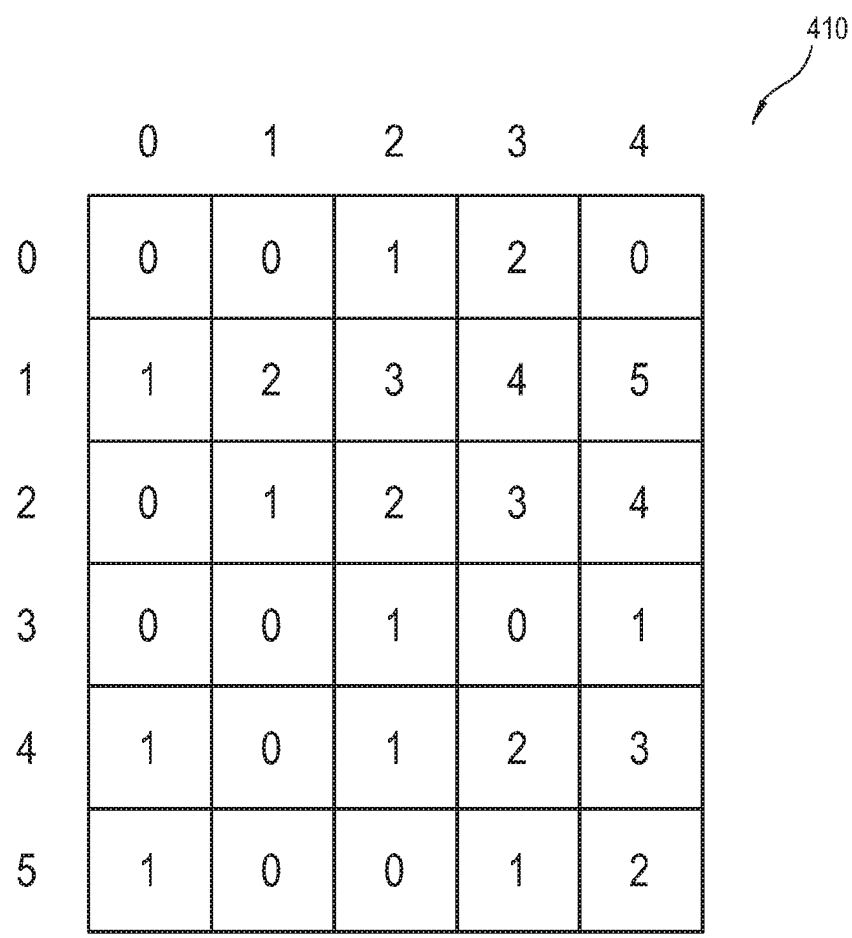
FIG. 19 illustrates that the dynamic programming is row-wise applied to the plurality of sub frames as shown in FIG. 16.

In this manner, if the dynamic programming is applied to each sub frame 380 assigned with the value of '1' as shown in FIG. 16, it results in FIG. 19.

FIG. 19 illustrates that the dynamic programming is row-wise applied to the plurality of sub frames as shown in FIG. 16.

As shown in FIG. 19, it will be described in this exemplary embodiment that the biggest continuous rectangle is determined within each row.

For example, in the row of '0', two sub frames 410 of (0,2) and (0,3) are assigned with the values of '1'. In this case, the dynamic programming makes the last sub frame 410 of (0,3) be assigned with the value of '2'.

In the row of '1', five sub frames 410 of (1,0), (1,1), (1,2), (1,3) and (1,4) are assigned with the values of '1'. In this case, the dynamic programming makes the sub frame 410 of (1,1) be assigned with the value of '2', the sub frame 410 of (1,2) be assigned with the value of '3', the sub frame 410 of (1,3) be assigned with the value of '4', and the last sub frame 410 of (1,4) be assigned with the value of '5'.

Likewise, if the dynamic programming is applied to all the rows, the sub frame 410 of (1,4) in the row of '1' has the highest value of '5' among all the sub frames 410. Thus, the display apparatus selects five sub frames 410 of (1,0), (1,1), (1,2), (1,3) and (1,4) as the biggest continuous rectangle and also determines it as the best candidate.

In this exemplary embodiment, the biggest continuous rectangle is determined within each row, but not limited thereto. Alternatively, similar principle may be applied to determine the best candidate.

FIG. 20 illustrates a programming code 420 for finally determining whether the video frame is the null frame in the display apparatus according to the fourth exemplary embodiment.

As shown in FIG. 20, the display apparatus includes a programming code 420 for finally determining whether the video frame is the null frame based on the best candidate. The programming code 420 reflects the following Expression.

$$f(x)=(A_{LCR}/A_{total})<TH; \text{Not null frame}$$

$$f(x)=(A_{LCR}/A_{total})\geq TH; \text{Null frame} \quad \text{[Expression]}$$

where, $A_{LCR}$ is the area of the best candidate, i.e. the biggest continuous rectangle, $A_{total}$ is the total area of the full frame, and TH is the threshold. This Expression shows that the video frame is the null frame if the area of the full frame occupied by the best candidate is relatively large, and the video frame is not the null frame if the area of the full frame occupied by the best candidate is relatively small.

In other words, the relatively large area of the best candidate means that the number of sub frames determined as the null frame is relatively high. Although the null frame is overlaid with the OSD, the area of the null frame except the area occupied by the OSD may include video information of the single dominant color. Thus, in the state that the video frame is divided into the plurality of sub frames, if the percentage of the null frame among the respective sub frames is high enough to exceed the threshold, the corresponding video frame is determined as the null frame. In this manner, the display apparatus determines whether a certain video frame is the null frame or not.

Below, details of sensing the null frame will be described.

Figure 21:
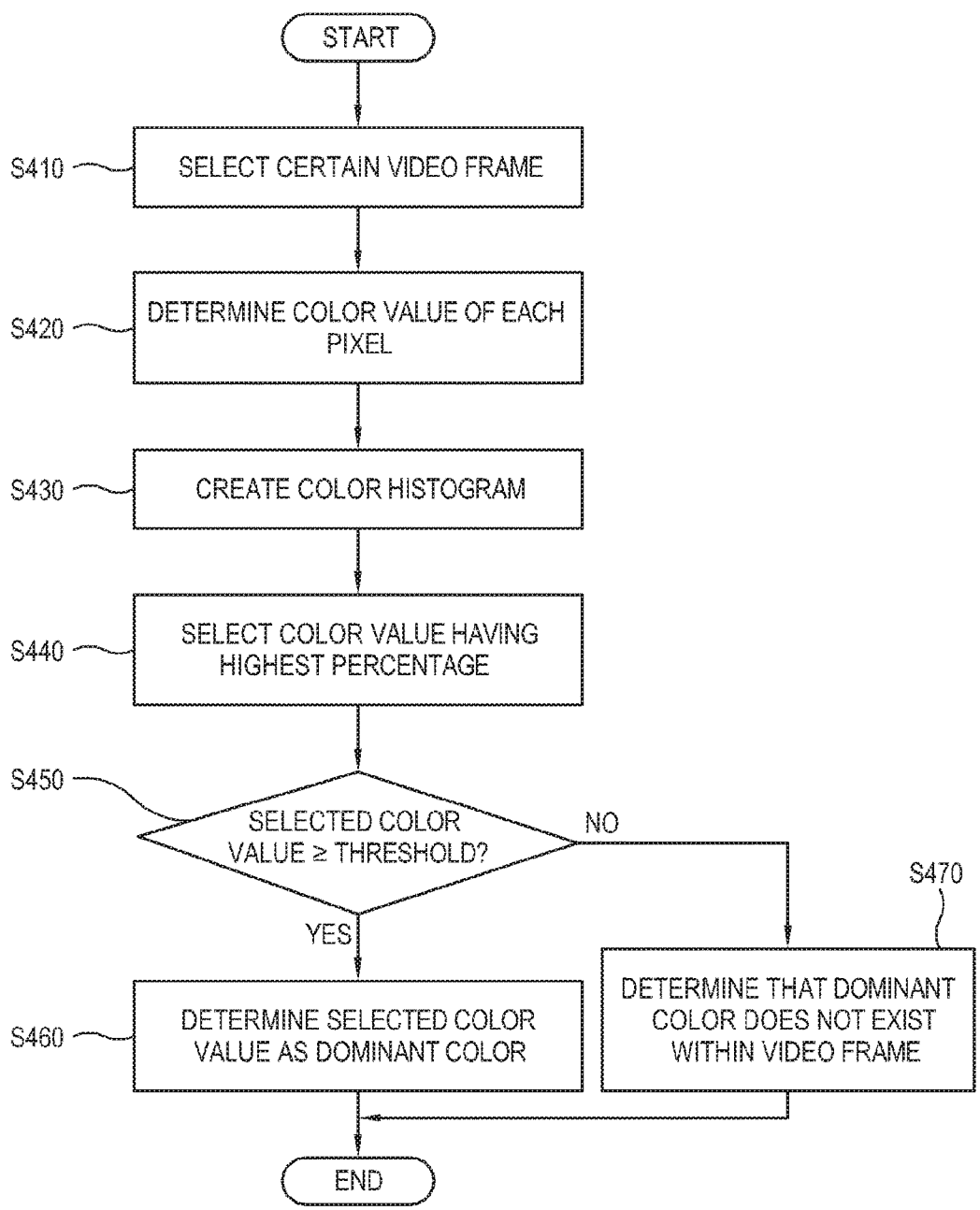
FIG. 21 is a flowchart showing a method of determining a dominant color of a certain video frame in the display apparatus according to the fourth exemplary embodiment.

FIG. 21 is a flowchart showing a method of determining a dominant color of a certain video frame in the display apparatus according to the fourth exemplary embodiment;

As shown in FIG. 21, at operation S410 the display apparatus selects a certain video frame.

At operation S420 the display apparatus determines a color value of each pixel within the video frame.

At operation S430 the display apparatus draws a color histogram showing percentages of pixels respectively corresponding to the color values in the video frame. That is, the color histogram shows how many pixels are assigned to each color value in the video frame.

At operation S440 the display apparatus selects the color value having the highest percentage in the color histogram.

At operation S450 the display apparatus determines whether the percentage of the selected color value is equal to or higher than the preset threshold.

If it is determined that the percentage of the selected color value is equal to or higher than the preset threshold, at operation S460 the display apparatus determines that the dominant color exists in this video frame, and determines this color value as the dominant color. On the other hand, if it is determined that the percentage of the selected color value is lower than the preset threshold, at operation S470 the display apparatus determines that the dominant color does not exist in the video frame.

Figure 22:
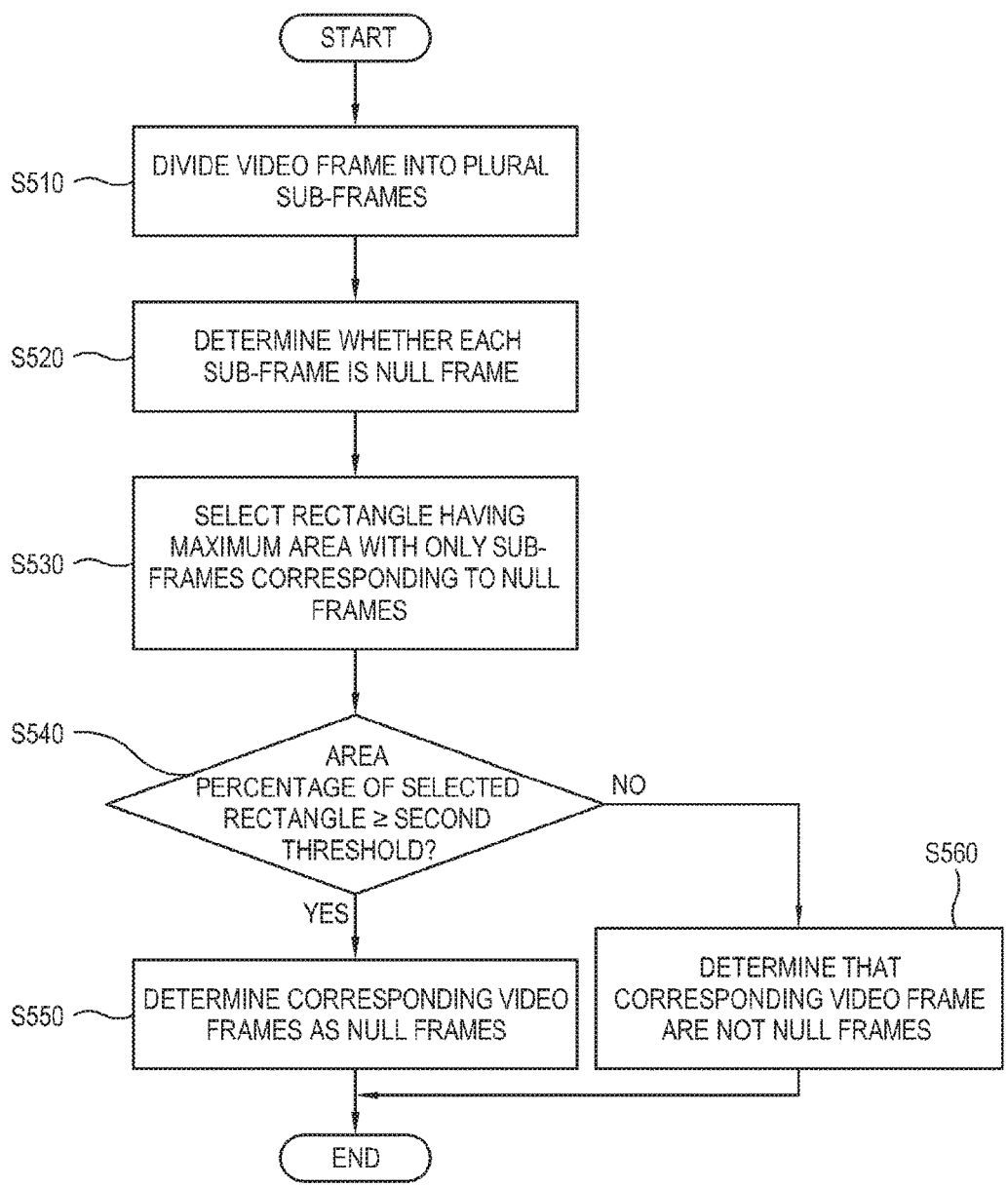
FIG. 22 is a flowchart showing a method of dividing a video frame into sub frames, determining a best candidate and finally determining the null frame in the display apparatus according to the fourth exemplary embodiment.

FIG. 22 is a flowchart showing a method of dividing a video frame into sub frames, determining a best candidate and finally determining the null frame in the display apparatus according to the fourth exemplary embodiment;

As shown in FIG. 22, at operation S510 the display apparatus divides the video frame into the plurality of sub frames. The number of sub frames may vary within the video frame in accordance with design. In this exemplary embodiment, the sub frame has a rectangular or square shape, and the respective sub frames have the same area.

At operation S520 the display apparatus determines whether each sub frame corresponds to the null frame, and thus distinguishes between the sub frames corresponding to the null frame and the sub frames corresponding to not the null frame. The display apparatus determines that the sub frames correspond to the null frame if the sub frames are formed by single color information of the dominant color of the video frame. Further, the display apparatus determines that the sub frame corresponds to the null frame if the percentage of the dominant color of the video frame among the colors of the sub frame is higher than a first threshold.

At operation S530 the display apparatus selects a rectangle occupying the maximum area among the rectangles formed by only the sub frames corresponding to the null frame. The selected rectangle is the biggest continuous rectangle.

At operation S540 the display apparatus determines the area occupied by the selected rectangle in the video frame exceeds a second threshold.

If the area occupied by the selected rectangle in the video frame exceeds the second threshold, at operation S550 the display apparatus determines that this video frame is the null frame. On the other hand, if the area occupied by the selected rectangle in the video frame does not exceed the second threshold, at operation S560 the display apparatus determines that this video frame is not the null frame.

There may be many reasons why the null frame is sensed among the plurality of video frames. One of the reasons is to determine time of switching content in the display apparatus.

Figure 23:
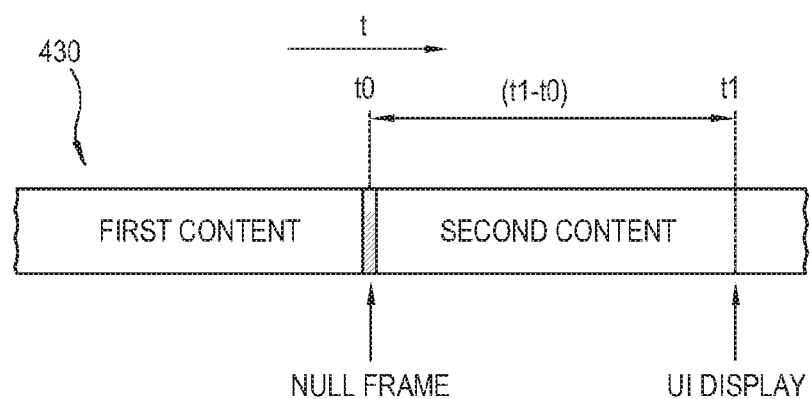
FIG. 23 illustrates a content switch in a video signal received in the display apparatus according to the fourth exemplary embodiment.

FIG. 23 illustrates a content switch in a video signal 430 received in the display apparatus according to the fourth exemplary embodiment;

As shown in FIG. 23, the display apparatus according to the fourth exemplary embodiment receives a video signal 430 from an image source, and processes the video signal 430, thereby displaying an image. The video signal 430 is switched from the first content to the second content as time t passes. If the display apparatus is set to display a predetermined UI after a preset time elapses from starting the content, the display apparatus has to know time of starting content, i.e. time of switching over from the first content to the second content.

Thus, the display apparatus senses the null frame among the plurality of video frames in the video signal 430. The display apparatus determines time t0, at which the null frame is displayed, as time, at which content is switched and displayed, and determines that the second content begins to be displayed from the time t0.

After the present time elapses from the time t0, the display apparatus displays a previously designated UI on an image of the second content. If the UI is displayed at time t1, the preset time is (t1-t0).

Content included in the UI may be previously stored in the display apparatus or provided from the image source or the external server. That is, the display apparatus may generate the UI based on previously stored information, or may generate the UI based on information provided from the image source or server. The UI may include various pieces of content such as a notification message, an advertisement, state information of the display apparatus, recommended content, recommended service, etc.

Figure 24:
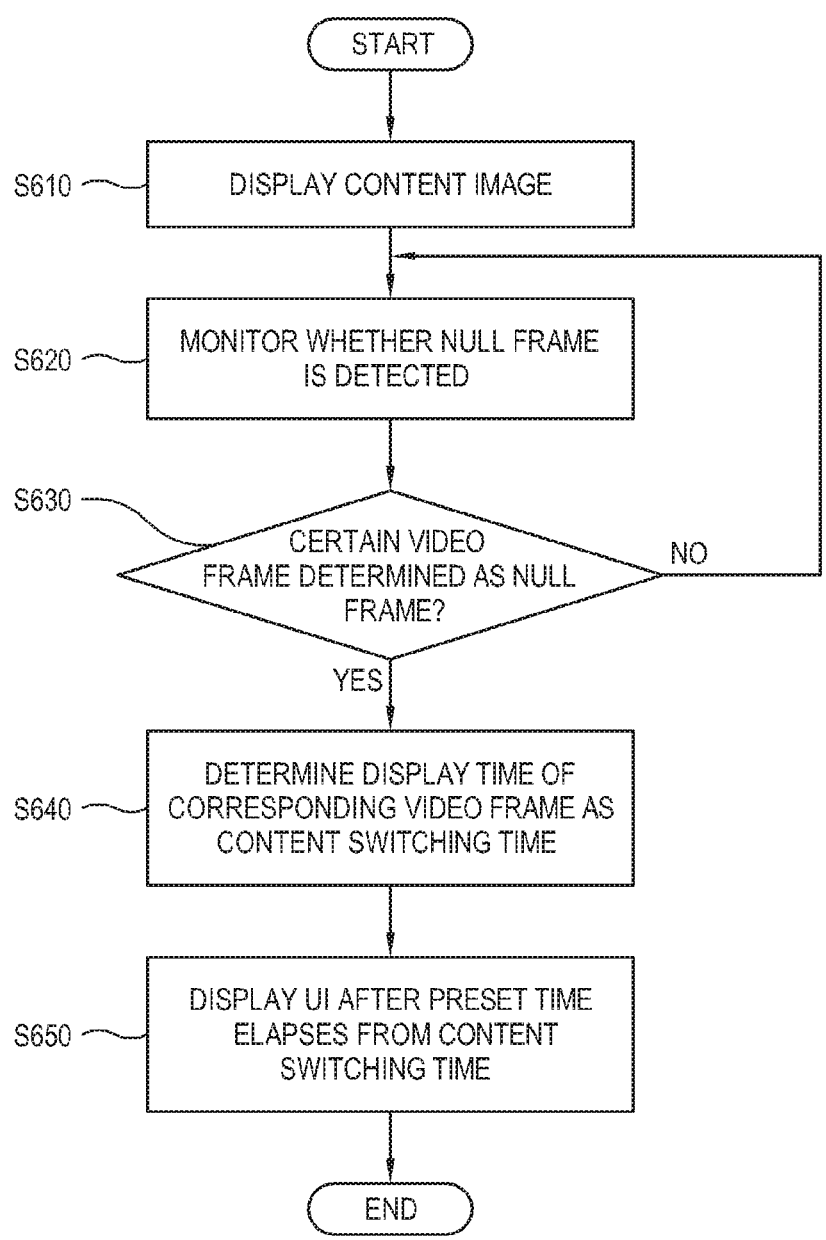
FIG. 24 is a flowchart showing a method of displaying a user interface (UI) by sensing a content switch in the display apparatus according to the fourth exemplary embodiment.

FIG. 24 is a flowchart showing a method of displaying a user interface (UI) by sensing a content switch in the display apparatus according to the fourth exemplary embodiment.

As shown in FIG. 24, at operation S610 the display apparatus processes the video signal and displays an image of content.

At operation S620 the display apparatus monitors whether the null frame is sensed while displaying the content image.

At operation S630 the display apparatus determine whether a certain video frame is the null frame during the monitoring operation.

If it is determined that the certain video frame is the null frame, at operation S640 the display apparatus determines the time of displaying the video frame as the time of switching the content. At operation S650 the display apparatus displays the UI after the preset time elapses from the determined time of switching the content.

On the other hand, if it is determined that the certain video frame is not the null frame, the display apparatus continues to monitor the null frame until the null frame is sensed.

FIG. 25 to FIG. 28 illustrate that the display apparatus according to the fourth exemplary embodiment displays UIs in accordance with content switches. FIG. 25 to FIG. 28 show change in images as time passes.

Figure 25:
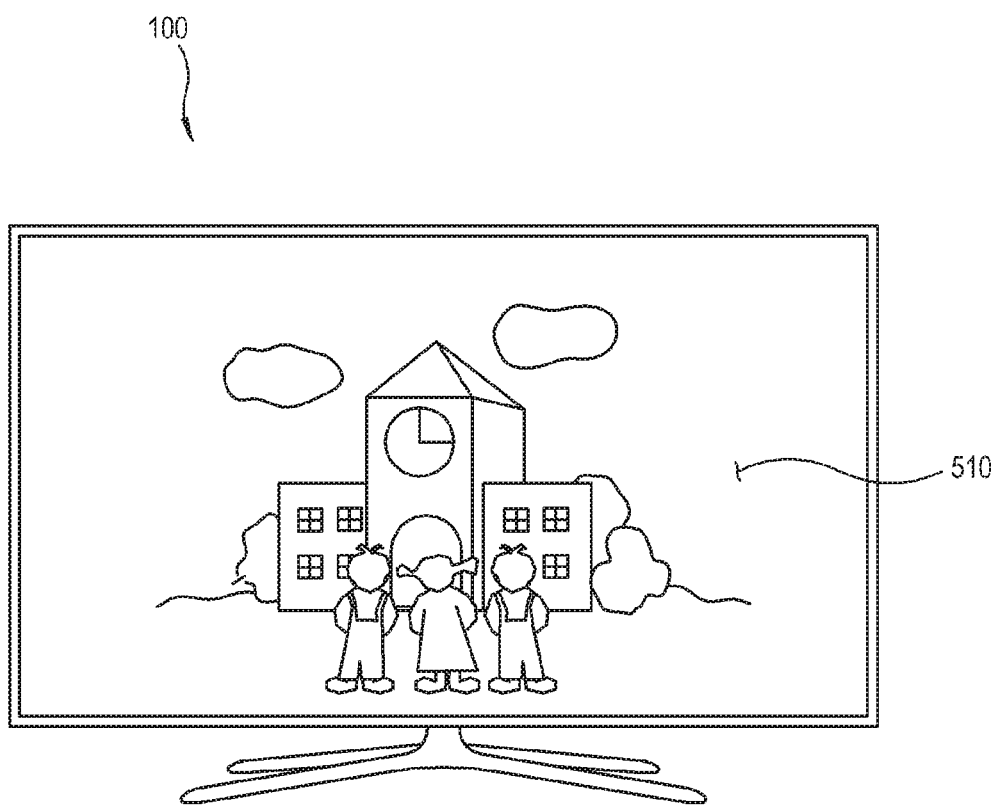
FIG. 25 to FIG. 28 illustrate that the display apparatus according to the fourth exemplary embodiment displays UIs in accordance with content switches.

As shown in FIG. 25, the display apparatus 100 receives a video signal from an image source, and processes the video signal to display an image. If the current video signal includes the first content, the display apparatus 100 processes the first content in the video signal and displays a first content image 510.

While the first content image 510 is being displayed, the display apparatus 100 determines whether the null frame exists in the video signal received from the image source. In determining which video frame is the null frame, the determination of the display apparatus 100 may be aimed at the currently displayed video frame or may be aimed at the video frame not displayed yet but processed to be displayed after a preset clock.

Figure 26:
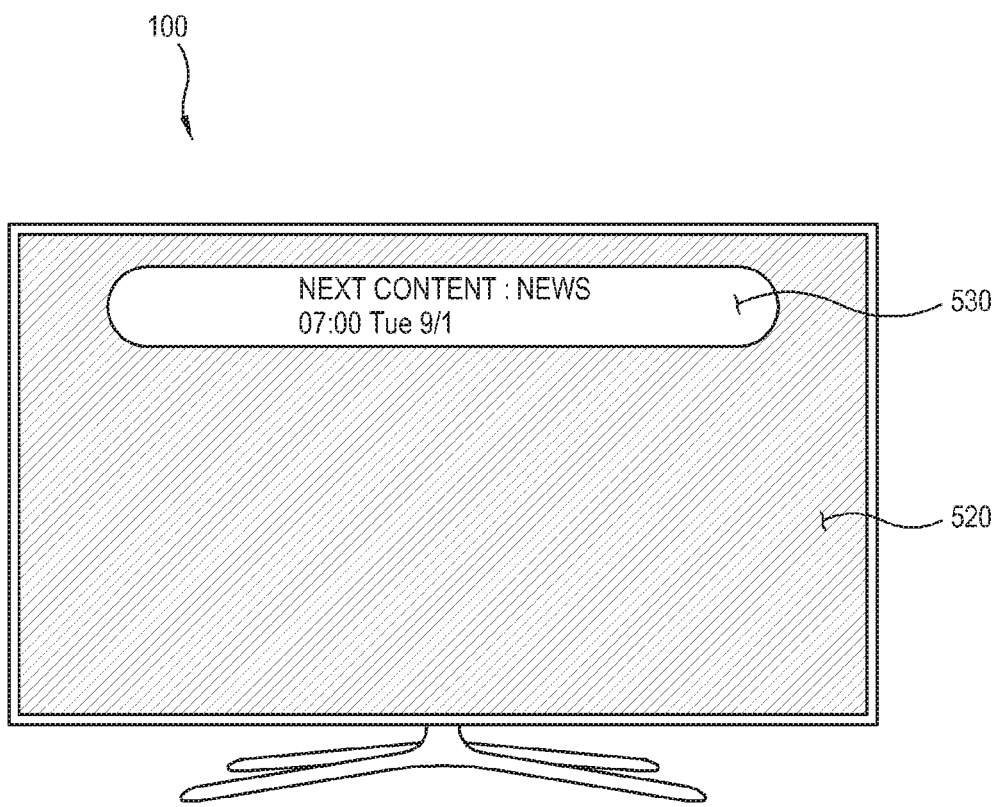

As shown in FIG. 26, the display apparatus 100 displays a null frame 520. The null frame 520 is arranged in time when the first content is ended in the video signal, and therefore the null frame 520 is displayed as the display of the first content image 510 (see FIG. 25) is finished.

The display apparatus 100 determines that the content of the video signal is switched over from the first content to the second content with respect to time of displaying the null frame 520 or time of sensing the null frame 520 in the video signal. That is, the display apparatus 100 regards the null frame 520 as time of starting the second content.

When the null frame 520 is displayed, the null frame 520 may be solely displayed. However, a separate OSD 530 may be overlaid on the null frame 520. Even in this case, the display apparatus 100 can sense the null frame 520, and details of sensing the null frame 520 are equivalent to those of the foregoing exemplary embodiments, and therefore repetitive descriptions thereof will be avoided as necessary.

Figure 27:
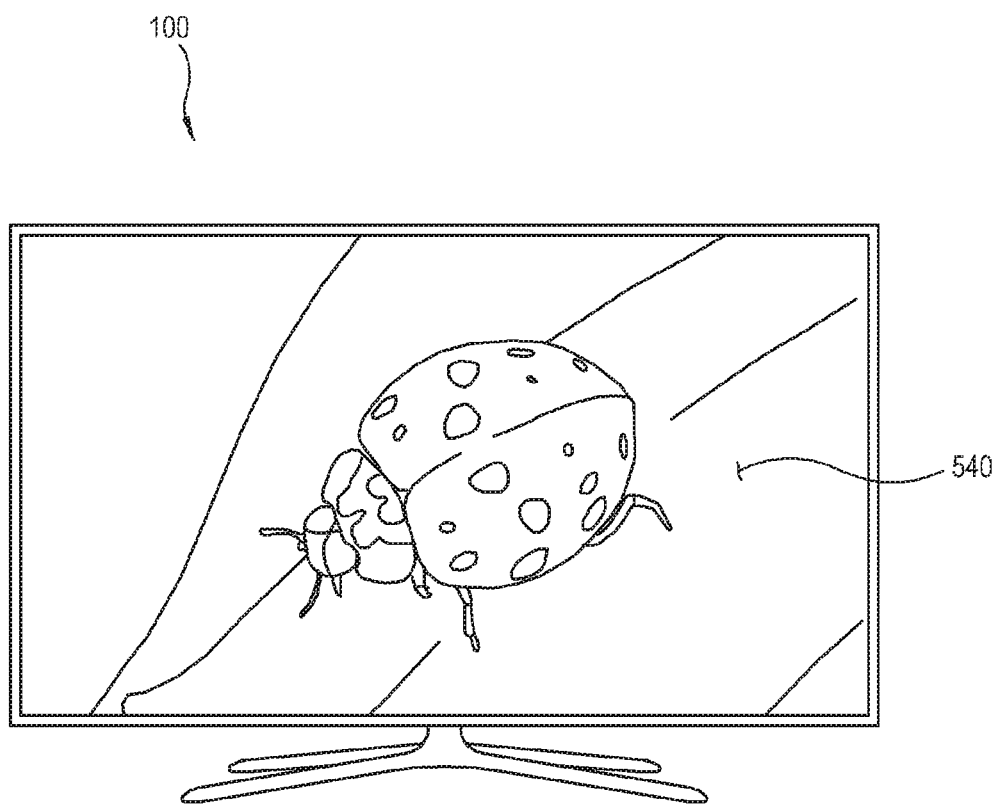

As shown in FIG. 27, the display apparatus 100 displays a second content image 540 by processing second content as content of a video signal is switched over from the first content to the second content. While the second content image 540 is being displayed, the display apparatus 100 counts internal system clocks until the preset time elapses from time of displaying or sensing the null frame 520 (see FIG. 26). When the preset time elapses, the display apparatus 100 generates the UI based information previously stored in the display apparatus 100 or information received from the exterior.

Figure 28:
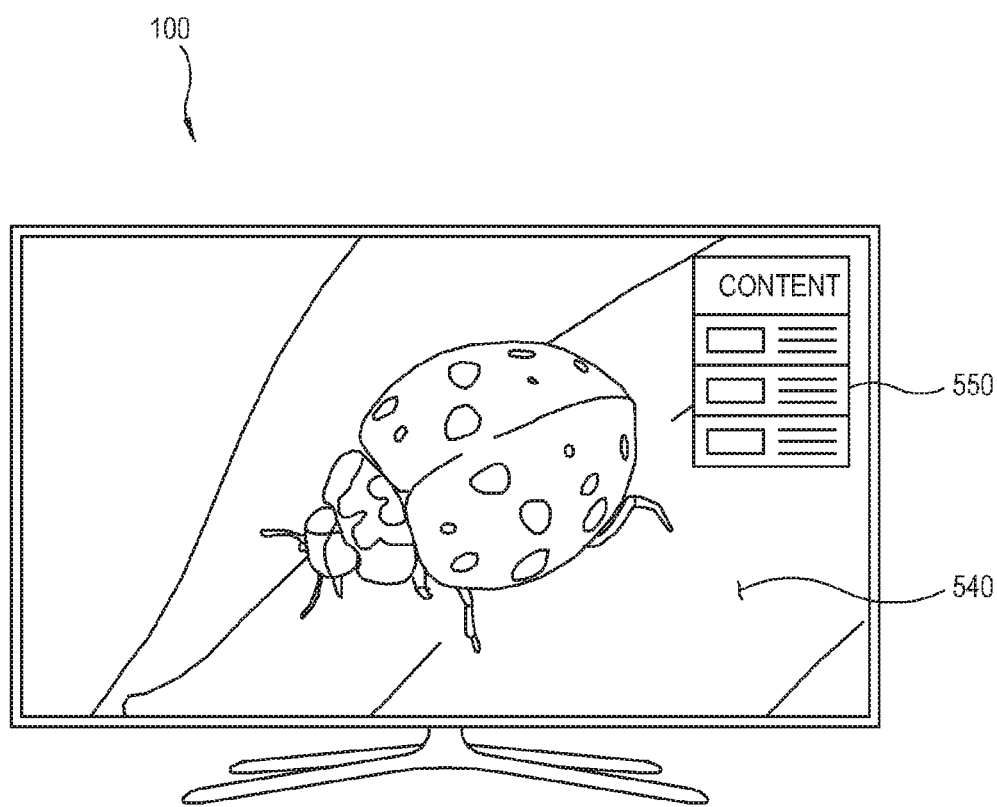

As shown in FIG. 28, the display apparatus 100 displays a UI 550 to be overlaid on the second content image 540 if it is determined that the preset time elapses from the time of displaying or sensing the null frame 520 (see FIG. 26), i.e. the time of starting the second content.

The UI 550 may for example include information about the content recommended service received in the display apparatus 100 from the server (not shown). Further, the UI 550 may include general information received from the server (not shown) or the image source (not shown). Such pieces of information may be received from the server (not shown) through the broadband network, or from the image source (not shown) through the broadband network or the broadcast network. When the information is transmitted from the image source (not shown), it may be transmitted by a separate carrier signal or transmitted as it is embedded in the video signal.

Like this, the display apparatus 100 can perform various operations by sensing the null frame.

In the foregoing exemplary embodiment, the null frame is sensed to determine whether the content is switched or not. However, the method of determining the time when the content is switched is not limited to the foregoing exemplary embodiments. Since many methods of determining the content switch are different in accuracy and processing load, the display apparatus may selectively use some methods. For example, the display apparatus may use a method in which accuracy is low but load is low if the processing load is relatively high in the current system, and may use a method in which accuracy is high and load is high if the processing load is relatively low in the current system. Further, the display apparatus may use a plurality of methods in sequence to improve the accuracy.

Figure 29:
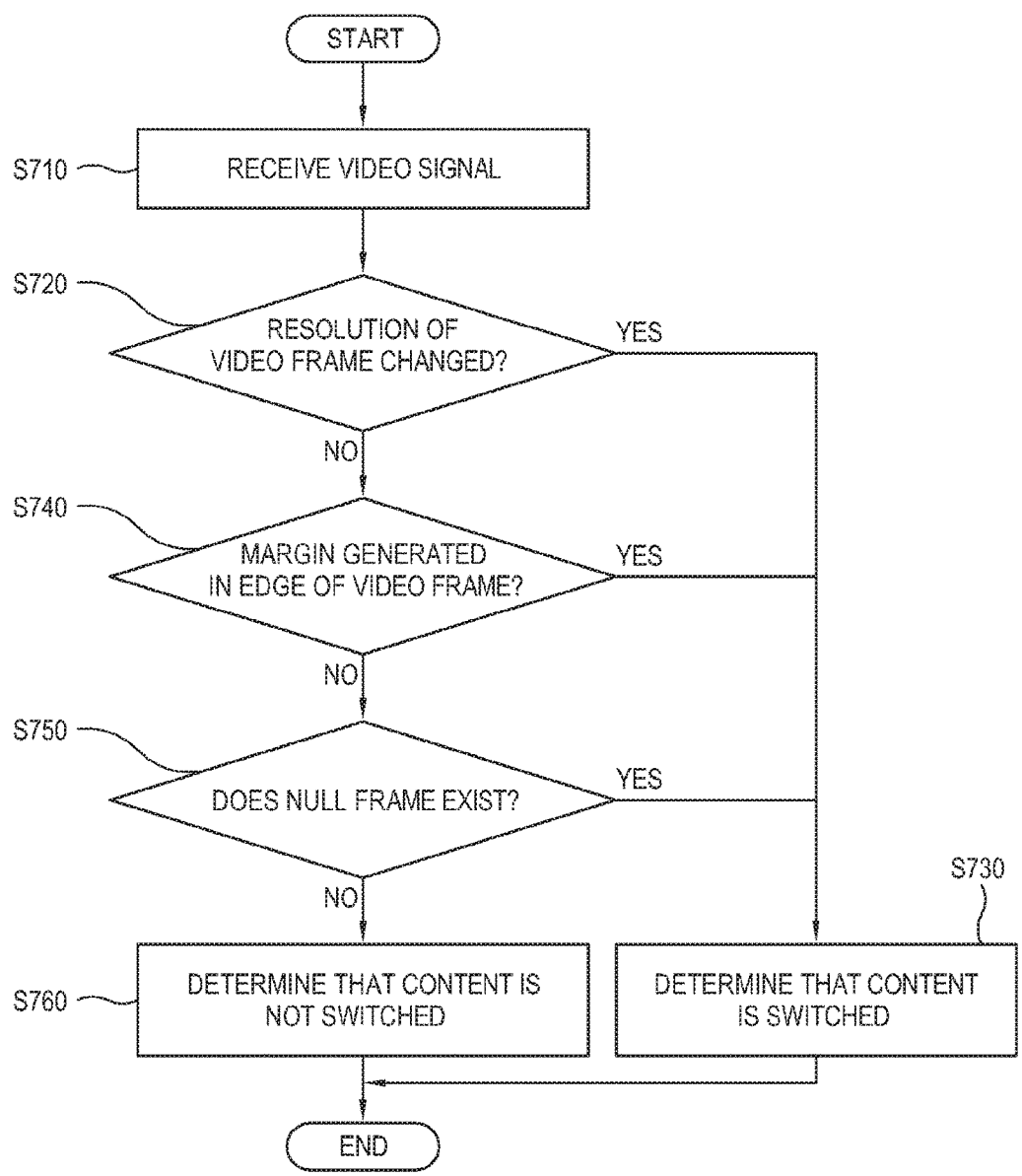
FIG. 29 is a flowchart showing a method of sensing a content switch in a display apparatus according to a fifth exemplary embodiment.

FIG. 29 is a flowchart showing a method of sensing a content switch in a display apparatus according to a fifth exemplary embodiment.

As shown in FIG. 29, at operation S710 the display apparatus receives a video signal including a plurality of video frames.

At operation S720 the display apparatus determines whether the video frame is changed in resolution. Since pieces of content are created under different creating environments, they may be different in resolution. If it is determined that the resolution of the video frame is changed, at operation S730 the display apparatus determines that the content is switched.

On the other hand, if it is determined that the resolution of the video frame is not changed, at operation S740 the display apparatus determines whether a margin is generated in an edge of the video frame. Although two pieces of content have the same resolution, if a certain piece of content has a relatively small screen size, the margin is generated in the edge. If it is determined that the margin is generated in the video frame, at operation S730 the display apparatus determines that the content is switched.

On the other hand, if it is determined that the margin is not generated in the video frame, at operation S750 the display apparatus determines whether the null frame exists. The method of determining the null frame is equivalent to those of the foregoing exemplary embodiments. If it is determined that the null frame exists in the video frame, at operation S730 the display apparatus determines that the content is switched.

On the other hand, if it is determined that the null frame does not exist in the video frame, at operation S760 the display apparatus determines that the content is not switched.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a display;
a signal receiver including receiver circuitry configured to receive a video signal comprising a plurality of video frames; and
at least one processor configured to:
divide each video frame of the plurality of video frames into a plurality of sub frames,
identify each sub frame as a null sub frame in response to the sub frame being formed by single color information of a dominant color of the video frame,
identify the video frame as a null frame, which is indicative of a switch in content in the video signal, in response to a maximum area formed by the sub frames identified as the null sub frames exceeding a first preset threshold, and
control the display to display an image based on the video signal in accordance with the determined null frame and the switch in content in the video signal.

2. The display apparatus according to claim 1, wherein the null frame is inserted in the video signal by an image source that provides the video signal and the null frame indicates a content switch in the video signal.

3. The display apparatus according to claim 2, wherein the at least one processor is configured to process a preset user interface (UI) to be displayed on a content image after a preset time elapses from a time when it is determined that the content switch is generated based on the null frame.

4. The display apparatus according to claim 1, wherein the at least one processor is configured to identify the sub frame as the null sub frame in response to a percentage of pixels having the dominant color being greater than a second preset threshold in color information of the sub frame.

5. The display apparatus according to claim 1, wherein the at least one processor is configured to divide the video frame into the plurality of sub frames having the same size as one another.

6. A method of controlling a display apparatus, the method comprising:
receiving a video signal comprising a plurality of video frames;
dividing each video frame of the plurality of video frames into a plurality of sub frames;
identifying each sub frame as a null sub frame in response to the sub frame being formed by single color information of a dominant color of the video frame;
identifying the video frame as a null frame, which is indicative of a switch in content in the video signal, in response to a maximum area formed by the sub frames identified as the null sub frames exceeding a first preset threshold, and controlling the display apparatus to display an image based on the video signal in accordance with the determined null frame and the switch in content in the video signal.

7. The method according to claim 6, wherein the null frame is inserted in the video signal by an image source for providing the video signal and the null frame indicates a content switch in the video signal.

8. The method according to claim 7, further comprising:
displaying a preset user interface (UI) on a content image after a preset time elapses from a time when it is determined that the content switch is generated based on the null frame.

9. The method according to claim 6, wherein the identifying each sub frame as the null sub frame comprises:
identifying the sub frame as the null sub frame in response to a percentage of pixels having the dominant color being greater than a second preset threshold in color information of the sub frame.

10. The method according to claim 6, wherein the dividing the video frame into the plurality of sub frames comprises:
dividing the video frame into the plurality of sub frames having the same size as one another.

* * * * *